United States Patent
Kawasaki

(10) Patent No.: US 11,425,722 B2
(45) Date of Patent: Aug. 23, 2022

(54) TRANSMISSION DEVICE, RECEPTION DEVICE, WIRELESS COMMUNICATION SYSTEM, AND WIRELESS COMMUNICATION METHOD

(71) Applicant: FUJITSU LIMITED, Kawasaki (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 17/025,900

(22) Filed: Sep. 18, 2020

(65) Prior Publication Data

US 2021/0007105 A1 Jan. 7, 2021

Related U.S. Application Data

(63) Continuation of application No. PCT/JP2018/013503, filed on Mar. 29, 2018.

(51) Int. Cl.
  *H04W 72/04* (2009.01)
  *H04L 5/00* (2006.01)
  *H04W 72/08* (2009.01)
  *H04W 72/12* (2009.01)

(52) U.S. Cl.
  CPC ....... *H04W 72/0473* (2013.01); *H04L 5/0048* (2013.01); *H04L 5/0082* (2013.01); *H04W 72/1268* (2013.01)

(58) Field of Classification Search
  None
  See application file for complete search history.

(56) References Cited

U.S. PATENT DOCUMENTS

| | | | |
|---|---|---|---|
| 2013/0324143 A1* | 12/2013 | Yokomakura | H04B 17/345 455/452.1 |
| 2015/0043476 A1* | 2/2015 | Takeda | H04W 72/1278 370/329 |
| 2015/0171983 A1* | 6/2015 | Kusashima | H04J 11/0023 370/329 |
| 2017/0244535 A1 | 8/2017 | Islam et al. | |

(Continued)

FOREIGN PATENT DOCUMENTS

| | | |
|---|---|---|
| EP | 3 429 291 A1 | 1/2019 |
| JP | 2018-505614 A | 2/2018 |

(Continued)

OTHER PUBLICATIONS

3GPP TS 38.331 V0.4.0, "3rd Generation Partnership Project Technical Specification Group Radio Access Network NR Radio Resource Control (RRC) Protocol specification (Release 15)", Dec. 2017, marked up version.

(Continued)

*Primary Examiner* — Sai Aung
(74) *Attorney, Agent, or Firm* — Myers Wolin, LLC.

(57) ABSTRACT

A transmission device includes: a transmitter configured to transmit first data by a first radio resource and transmit second data by a second radio resource, the second radio resource having a longer time length than the first radio resource; and a processor configured to insert a known signal to a part of the second radio resource in a first region in which the first radio resource and the second radio resource overlap in a time axis direction, and cause the transmitter to transmit the first data and the second data.

6 Claims, 21 Drawing Sheets

(56) References Cited

U.S. PATENT DOCUMENTS

| | | |
|---|---|---|
| 2017/0331573 A1 | 11/2017 | Li |
| 2017/0346598 A1* | 11/2017 | Robert Safavi ..... H04W 52/283 |
| 2018/0234977 A1* | 8/2018 | Yasukawa ............. H04W 48/16 |

FOREIGN PATENT DOCUMENTS

| | | |
|---|---|---|
| WO | 2017/143925 A1 | 8/2017 |
| WO | 2017/164222 A1 | 9/2017 |

OTHER PUBLICATIONS

3GPP TS 38.410 V0.6.0, "3rd Generation Partnership Project; Technical Specification Group Radio Access Network; NG-RAN; NG general aspect and principles (Release 15)", Dec. 2017, marked up version.

3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017, marked up version.

3GPP TS 38.420 V0.5.0, "3rd Generation Partnership Project; Technical Specification Group Radio Access Network; NG-RAN; Xn general aspects and principles (Release 15)", Dec. 2017, marked up version.

3GPP TS 38.423 V0.5.0, "3rd Generation Partnership Project; Technical Specification Group Radio Access Network; NG Radio Access Network (NG-RAN); Xn application protocol (XnAP) (Release 15)", Dec. 2017, marked up version.

3GPP TS 36.211 V14.4.0, 3rd Generation Partnership Project; Technical Specification Group Radio Access Network; Evolved Universal Terrestrial Radio Access (E-UTRA); Physical channels and modulation (Release 14), Sep. 2017.

3GPP TS 36.212 V14.4.0, "3rd Generation Partnership Project; Technical Specification Group Radio Access Network; Evolved Universal Terrestrial Radio Access (E-UTRA); Multiplexing and channel coding, (Release 14)", Sep. 2017.

3GPP TS 36.213 V14.4.0, "3rd Generation Partnership Project; Technical Specification Group Radio Access Network; Evolved Universal Terrestrial Radio Access (E-UTRA); Physical layer procedures, (Release 14)", Sep. 2017.

3GPP TS 36.300 V14.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Sep. 2017.

3GPP TS 36.321 V14.4.0, "3rd Generation Partnership Project; Technical Specification Group Radio Access Network; Evolved Universal Terrestrial Radio Access (E-UTRA); Medium Access Control (MAC) protocol specification, (Release 14)", Sep. 2017.

3GPP TS 36.322 V14.1.0, "3rd Generation Partnership Project; Technical Specification Group Radio Access Network; Evolved Universal Terrestrial Radio Access (E-UTRA); Radio Link Control (RLC) protocol specification (Release 14)", Sep. 2017.

3GPP TS 36.323 V14.4.0, "3rd Generation Partnership Project; Technical Specification Group Radio Access Network; Evolved Universal Terrestrial Radio Access (E-UTRA); Packet Data Convergence Protocol (PDCP) specification, (Release 14)", Sep. 2017.

3GPP TS 36.331 V14.4.0, "3rd Generation Partnership Project; Technical Specification Group Radio Access Network; Evolved Universal Terrestrial Radio Access (E-UTRA); Radio Resource Control (RRC); Protocol specification, (Release 14)", Sep. 2017.

3GPP TS 36.413 V14.4.0, "3rd Generation Partnership Project; Technical Specification Group Radio Access Network; Evolved Universal Terrestrial Radio Access Network (E-UTRAN); S1 Application Protocol (S1AP), (Release 14)", Sep. 2017.

3GPP TS 36.423 V14.4.0, "3rd Generation Partnership Project; Technical Specification Group Radio Access Network; Evolved Universal Terrestrial Radio Access Network (E-UTRAN); X2 application protocol (X2AP)", Sep. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.

3GPP TS 37.340 V2.0.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2017, with cover sheet.

3GPP TS 38.201 V1.1.0, "3rd Generation Partnership Project; Technical Specification Group Radio Access Network; NR; Physical layer; General description (Release 15)", Nov. 2017.

3GPP TS 38.202 V1.1.0, "3rd Generation Partnership Project; Technical Specification Group Radio Access Network; NR; Services provided by the physical layer (Release 15)", Nov. 2017, with cover sheet.

3GPP TS 38.211 V1.2.0, "3rd Generation Partnership Project; Technical Specification Group Radio Access Network; NR; Physical channels and modulation (Release 15)", Nov. 2017.

3GPP TS 38.212 V1.2.0, "3rd Generation Partnership Project; Technical Specification Group Radio Access Network; NR; Multiplexing and channel coding (Release 15)", Nov. 2017.

3GPP TS 38.213 V1.2.0, "3rd Generation Partnership Project; Technical Specification Group Radio Access Network; NR; Physical layer procedures for control (Release 15)", Nov. 2017.

3GPP TS 38.214 V1.2.0, "3rd Generation Partnership Project; Technical Specification Group Radio Access Network; NR; Physical layer procedures for data (Release 15)", Nov. 2017.

3GPP TS 38.215 V1.2.0, "3rd Generation Partnership Project; Technical Specification Group Radio Access Network; NR; Physical layer measurements (Release 15)", Nov. 2017.

3GPP TS 38.300 V2.0.0, "3rd Generation Partnership Project; Technical Specification Group Radio Access Network; NR; NR and NG-RAN Overall Description; Stage 2 (Release 15)", Dec. 2017, with cover sheet.

3GPP TS 38.321 V2.0.0, "3rd Generation Partnership Project; Technical Specification Group Radio Access Network; NR; Medium Access Control (MAC) protocol specification (Release 15)", Dec. 2017, with cover sheet.

3GPP TS 38.322 V2.0.0, "3rd Generation Partnership Project; Technical Specification Group Radio Access Network; NR; Radio Link Control (RLC) protocol specification (Release 15)", Dec. 2017, with cover sheet.

3GPP TS 38.323 V2.0.0, "3rd Generation Partnership Project; Technical Specification Group Radio Access Network; NR; Packet Data Convergence Protocol (PDCP) specification (Release 15)", Dec. 2017, with cover sheet.

3GPP TS 38.331 V0.4.0, "3rd Generation Partnership Project Technical Specification Group Radio Access Network NR Radio Resource Control (RRC) Protocol specification (Release 15)", Dec. 2017, clean version.

3GPP TS 38.401 V1.0.0, "3rd Generation Partnership Project; Technical Specification Group Radio Access Network; NG-RAN; Architecture description (Release 15)", Dec. 2017, with cover sheet.

3GPP TS 38.410 V0.6.0, "3rd Generation Partnership Project; Technical Specification Group Radio Access Network; NG-RAN; NG general aspect and principles (Release 15)", Dec. 2017, clean version, with cover sheet and list of open issues.

3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017, clean version, with cover sheet and list of open issues.

3GPP TS 38.420 V0.5.0, "3rd Generation Partnership Project; Technical Specification Group Radio Access Network; NG-RAN; Xn general aspects and principles (Release 15)", Dec. 2017, clean version, with cover sheet.

3GPP TS 38.423 V0.5.0, "3rd Generation Partnership Project; Technical Specification Group Radio Access Network; NG Radio Access Network (NG-RAN); Xn application protocol (XnAP) (Release 15)", Dec. 2017, clean version, with cover sheet.

(56) References Cited

OTHER PUBLICATIONS

3GPP TS 38.470 V1.0.0, "3rd Generation Partnership Project; Technical Specification Group Radio Access Network; NG-RAN; F1 general aspects and principles (Release 15)", Dec. 2017, with cover sheet.
3GPP TS 38.473 V1.0.0, "3rd Generation Partnership Project; Technical Specification Group Radio Access Network; NG-RAN; F1 application protocol (F1AP) (Release 15)", Dec. 2017, with cover sheet.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
Huawei et al., "On slot-based and non-slot-based scheduling", Agenda Item: 7.3.1.4, 3GPP TSG-RAN WG1 Meeting #90bis, R1-1718874, Prague, Czech Republic, Oct. 9 -13, 2017.
Qualcomm Incorporated, "eMBB and URLLC dynamic multiplexing and preemption indication on the uplink", Agenda Item: 7.2.4, 3GPP TSG-RAN WG1 Meeting #92, R1-1802854, Athens, Greece, Feb. 26-Mar. 2, 2018.
Intel Corporation, "On DMRS Sharing for subslot sPDSCH", Agenda Item: 6.2.1.2.4, 3GPP TSG-RAN WG1 Meeting #92, R1-1802358, Athens, Greece, Feb. 26-Mar. 2, 2018.
Interdigital Communications, "Design considerations for mini-slots", Agenda Item: 5.1.4, 3GPP TSG-RAN WG1 AH_NR Meeting, RI-1700853, Spokane, USA, Jan. 16-20, 2017.
International Search Report and Written Opinion of the International Searching Authority issued by the Japan Patent Office for corresponding International Patent Application No. PCT/JP2018/013503, dated May 1, 2018, with an English translation.

\* cited by examiner

FIG. 14

| T101<br>MODULATION SCHEME | T102<br>ARRANGEMENT PATTERN |
|---|---|
| BPSK | TYPE-A |
| QPSK | TYPE-A |
| 16QAM | TYPE-B |
| 64QAM | TYPE-B |
| 256QAM | TYPE-B |

FIG. 17

| T101A<br>MODULATION SCHEME | T102A<br>ARRANGEMENT PATTERN |
|---|---|
| BPSK | TYPE-A |
| QPSK | TYPE-A |
| 16QAM | TYPE-B |
| 64QAM | TYPE-C |
| 256QAM | TYPE-D |

TRANSMISSION DEVICE, RECEPTION DEVICE, WIRELESS COMMUNICATION SYSTEM, AND WIRELESS COMMUNICATION METHOD

CROSS-REFERENCE TO RELATED APPLICATION

This application is a continuation application of International Application PCT/JP2018/013503 filed on Mar. 29, 2018 and designated the U.S., the entire contents of which are incorporated herein by reference.

FIELD

The present invention relates to a transmission device, a reception device, a wireless communication system, and a wireless communication method in a next-generation mobile communication system.

BACKGROUND

In recent years, to achieve further increase in speed, capacity, and the like of wireless communication (that can also be called mobile communication) assuming various use cases for wireless communication systems (that can also be called mobile communication systems) such as mobile phone systems (cellular systems), next-generation wireless communication technologies are being discussed. For example, in the standardization organization called 3rd generation partnership project (3GPP), specifications of communication standards called long term evolution (LTE) and LTE-advanced (LTE-A) based on an LTE wireless communication technology have already been developed, and study work for expanding its functionality is being continuously performed. For example, standardization of the fifth generation mobile communication system (that can also be called 5G system) for implementing operation scenarios and technical requirements presented by the international telecommunication union radio communications sector (ITU-R) are being discussed.

In the next-generation mobile communication systems of 5G and subsequent systems, services requiring a different level of communication performance from conventional systems, such as tactile communication, augmented reality, or the like, are expected to appear. To implement such new services, the 5G system has adopted a design policy that allows flexible changes in operation mode. For example, in the fourth generation mobile communication system (which can also be called 4G system) such as LTE or LTE-Advanced, the scheduling time unit is fixed whereas in the 5G system, allowing changes in the scheduling time unit is being studied.

An example of the related art includes International Publication Pamphlet No. WO 2017/164222.

Furthermore, examples of the related art include 3GPP TS 36.211 V14.4.0 (2017-09), 3GPP TS 36.212 V14.4.0 (2017-09), 3GPP TS 36.213 V14.4.0 (2017-09), 3GPP TS 36.300 V14.4.0 (2017-09), 3GPP TS 36.321 V14.4.0 (2017-09), 3GPP TS 36.322 V14.1.0 (2017-09), 3GPP TS 36.323 V14.4.0 (2017-09), 3GPP TS 36.331 V14.4.0 (2017-09), 3GPP TS 36.413 V14.4.0 (2017-09), 3GPP TS 36.423 V14.4.0 (2017-09), 3GPP TS 36.425 V14.0.0 (2017-03), 3GPP TS 37.340 V2.0.0 (2017-12), 3GPP TS 38.201 V1.1.0 (2017-11), 3GPP TS 38.202 V1.1.0 (2017-11), 3GPP TS 38.211 V1.2.0 (2017-11), 3GPP TS 38.212 V1.2.0 (2017-11), 3GPP TS 38.213 V1.2.0 (2017-11), 3GPP TS 38.214 V1.2.0 (2017-11), 3GPP TS 38.215 V1.2.0 (2017-11), 3GPP TS 38.300 V2.0.0 (2017-12), 3GPP TS 38.321 V2.0.0 (2017-12), 3GPP TS 38.322 V2.0.0 (2017-12), 3GPP TS 38.323 V2.0.0 (2017-12), 3GPP TS 38.331 V0.4.0 (2017-12), 3GPP TS 38.401 V1.0.0 (2017-12), 3GPP TS 38.410 V0.6.0 (2017-12), 3GPP TS 38.413 V0.5.0 (2017-12), 3GPP TS 38.420 V0.5.0 (2017-12), 3GPP TS 38.423 V0.5.0 (2017-12), 3GPP TS 38.470 V1.0.0 (2017-12), 3GPP TS 38.473 V1.0.0 (2017-12), 3GPP TR 38.801 V14.0.0 (2017-04), 3GPP TR 38.802 V14.2.0 (2017-09), 3GPP TR 38.803 V14.2.0 (2017-09), 3GPP TR 38.804 V14.0.0 (2017-04), 3GPP TR 38.900 V14.3.1 (2017-07), 3GPP TR 38.912 V14.1.0 (2017-06), 3GPP TR 38.913 V14.3.0 (2017-06), 3GPP R1-1718874, "On slot-based and non-slot-based scheduling", Huawei, Ericsson, AT & T, Nokia (2017-10), and 3GPP R1-1802854, "eMBB and URLLC dynamic multiplexing and preemption indication on the uplink", Qualcomm Incorporated (2018-3).

SUMMARY

According to an aspect of the embodiments, a transmission device includes: a transmitter configured to transmit first data by a first radio resource and transmit second data by a second radio resource, the second radio resource having a longer time length than the first radio resource; and a processor configured to insert a known signal to a part of the second radio resource in a first region in which the first radio resource and the second radio resource overlap in a time axis direction, and cause the transmitter to transmit the first data and the second data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating an example of a relationship between a modulation scheme to be applied to a second radio resource and an arrangement pattern of a second known signal;

FIG. 17 is a diagram illustrating another example of the relationship between a modulation scheme to be applied to a second radio resource and an arrangement pattern of a second known signal;

DESCRIPTION OF EMBODIMENT(S)

Figure 1:
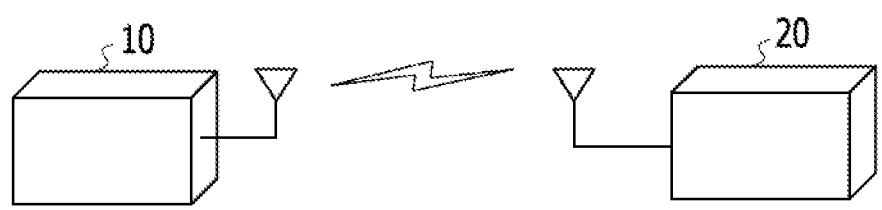
FIG. 1 is a diagram illustrating an example of a configuration of a wireless communication system according to Example 1.

As described above, in the discussion regarding the standardization of the 5G system, the design policy that allows flexible changes in the operation mode are being studied. As a result of diligent study for such a design policy, the inventors of the present invention have found that an operation mode in which schedulings in a plurality of different time units are mixed is expected in a radio frame structure of the 5G system. For example, a service in which the scheduling time unit is one slot unit and a service scheduled in a time unit not limited to the one slot unit can be mixed.

However, in the discussion regarding the standardization of the 5G system, basic system designs are mainly being studied, and it is hard to say that sufficient discussion has been made regarding specific implementation technologies for implementing wireless services of the 5G system. For example, discussion and the like about implementation issues in the case where schedulings in a plurality of different time units are mixed in a radio frame structure in the 5G system has not been progressed enough.

According to one aspect of the disclosed technology, described are a transmission device, a reception device, a wireless communication system, and a wireless communication method capable of appropriately performing wireless communication in a radio frame structure in which schedulings in a plurality of different time units are mixed.

As described above, the discussion regarding the standardization of the 5G system has just begun. For example, the discussion and the like about implementation issues in the case of performing wireless communication using a radio frame structure in which schedulings in a plurality of different time units are mixed has not been progressed enough.

As a result of diligent study for the flexible operation mode of the 5G system, the inventors of the present invention have found that transmission power of a wireless signal may be output exceeding an upper limit value on a standard in the case of performing wireless communication using the radio frame structure in which schedulings in a plurality of different time units are mixed.

For example, in the 5G system, a scheduling of a radio resource in a time unit shorter than one slot is allowed. A slot of the time unit shorter than one slot will be called first slot for convenience of description. Note that the first slot may also be called mini-slot or non-slot. The first slot is a time unit shorter than a slot (that can also be called second slot) including, for example, 14 orthogonal frequency division multiplexing (14OFDM) symbols (hereinafter abbreviated as symbols). In other words, the first slot includes a smaller number of symbols than the number of symbols configuring the second slot, and may include, for example, one symbol or any of two symbols to thirteen symbols. In still other words, the second slot is a time unit having a longer time length than the first slot, and is only required to include a larger number of symbols than the number of symbols configuring the first slot. Note that the slot in the present disclosure is an example of a scheduling time unit in a radio frame structure in a wireless communication system 1, and may be restated as a time slot, a subframe, a section, a period, or the like.

In the radio frame structure in which the first slot (that may also be called mini-slot) and the second slot (that may also be called normal-slot or long-slot) are mixed, transmission data of a first service can be mapped to a radio resource of the first slot in a time range in which the first slot overlaps with the second slot after transmission data of a second service is mapped to a radio resource of the second slot, for example. In this case, the transmission power of the transmission data of the second service may not consider the transmission power of the transmission data of the first service. For example, when there is a time lag between the timing at which the transmission data of the first service is mapped and the timing at which the transmission data of the second service is mapped, the transmission power of the transmission data of the second service may not consider the transmission power of the transmission data of the first service.

The transmission power is determined at the time of mapping the transmission data, and may not consider the transmission power of another transmission data mapped at different timing. As a result, in the time range in which the first slot and the second slot overlap, the transmission power of the transmission data of the first service and the transmission power of the transmission data of the second service are superimposed, and total transmission power of the first service and the second service may exceed an upper limit value (that can also be called maximum transmission power value) in the standard.

Generally, a transmission device that transmits a wireless signal, using transmission power exceeding the maximum transmission power value in the standard of the wireless communication system may become an interference source to a reception device that wirelessly communicates with another transmission device in the wireless communication system. Furthermore, from another point of view, it may be desired to appropriately control the transmission power from the transmission device so that the transmission power falls within a range less than the maximum transmission power value in the standard.

Furthermore, according to another aspect, in the radio frame structure in which schedulings in a plurality of different time units are mixed, even if the total transmission power is less than the maximum transmission power value, the transmission quality of the wireless signal may be affected by mixture of radio resources in the plurality of different time units. As described above, it may be desired to appropriately control wireless communication to secure tolerance to the influence on the transmission quality that may occur due to mixture of radio resources in a plurality of different time units.

However, in the discussion regarding the standardization of the 5G system, adopting the design policy that allows flexible changes in the operation mode has been agreed but not specific measures for appropriately performing wireless communication in the radio frame structure in which schedulings in a plurality of different time units are mixed have been determined yet.

The inventors of the present invention have gained unique knowledge that the above-described technical circumstances may be an obstacle in implementing various wireless services such as enhanced mobile broadband (eMBB) that is a ultra-high-speed and large-capacity data transmission service, a ultra-reliable and low latency communications (URLLC) that is ultra-high reliability and low latency communication, and massive machine type communications (mMTC) that is a ultra-mass connection wireless service. Note that the 5G system in the present disclosure is an example of a mobile communication system (that can also be called next-generation wireless communication system) that supports the radio frame structure in which schedulings in a plurality of different time units are mixed. Note that the above-described problem may occur in a case where a conventional mobile communication system (for example, the 4G system) is expanded to support the radio frame structure in which schedulings in a plurality of different time units are mixed.

Hereinafter, modes for carrying out the present invention (hereinafter, also called embodiments or examples) will be described with reference to the drawings. Configurations of examples to be described below are examples for embodying the technical idea of the present invention, and it is not intended that the present invention is limited to the configurations of these examples and the present invention is equally applicable to other embodiments within the scope of the claims. For example, names of various channels such as physical downlink shared channel (PDSCH) and physical uplink shared channel (PUSCH) may be changed in future discussion regarding the standardization of the 5G system. Furthermore, terms related to the radio frame structure such as subframe, slot, symbol, resource element, resource block, and subcarrier may also be similarly changed. Note that the present disclosure is not intended to limit components of the present invention to those using these names.

Furthermore, it also goes without saying that the examples to be described below may be implemented in appropriate combination. Here, the entire contents of Non-Patent Documents 1 to 38 are incorporated herein by reference.

EXAMPLE 1

Example 1 illustrates a wireless communication system that allows a radio frame in which schedulings in a plurality of different time units are mixed. A transmission device in the wireless communication system according to Example 1 can change transmission power in a range (that can also be called first region) in a second radio resource to which data of a second service is mapped, the range where the second radio resource overlaps with a first radio resource to which data of a first service can be mapped in a time axis direction. In other words, a transmission device in the wireless communication system according to Example 1 is configured to be able to transmit first data by a first radio resource and transmit second data by a second radio resource having a longer time length than the first radio resource, and can change transmission power in a portion of the second radio resource in a first region where the second radio resource and the first radio resource overlap in a time axis direction. According to one aspect of Example 1, an excess in transmission power in a radio frame structure in which schedulings in a plurality of different time units are mixed can be suppressed, and a transmission device and a reception device can appropriately perform wireless communication.

FIG. 1 is a diagram illustrating an example of a configuration of a wireless communication system 1 according to Example 1. The wireless communication system 1 illustrated in FIG. 1 includes a transmission device 10 and a reception device 20. Note that the transmission device 10 and the reception device 20 illustrated in FIG. 1 are abstract representations of a plurality of properties (that can also be called aspects and viewpoints). In other words, the transmission device 10 and the reception device 20 may be specifically applied to different devices according to an observed aspect. For example, the transmission device 10 has an aspect as a wireless terminal (user equipment (UE) or which can also be called mobile station) in the case of uplink and has an aspect as a wireless base station (that can also be called base station (BS)) in the case of downlink. Furthermore, the reception device 20 has an aspect as a wireless base station in the case of uplink and has an aspect as a wireless terminal in the case of downlink. In other words, a wireless terminal corresponds to the transmission device 10 in FIG. 1 in the case of uplink and corresponds to the reception device 20 in FIG. 1 in the case of downlink. A wireless base station corresponds to the reception device 20 in FIG. 1 in the case of uplink and corresponds to the transmission device 10 in FIG. 1 in the case of downlink.

The transmission device 10 illustrated in FIG. 1 is configured to be able to transmit a radio frame in which schedulings in a plurality of different time units are mixed. In other words, the transmission device 10 can perform wireless communication in a radio frame structure in which a first service in which first data is scheduled using a first radio resource in a first slot unit and a second service in which second data is scheduled using a second radio resource in a second slot unit having a longer time length than the first slot are mixed. Then, the transmission device 10 can change transmission power in a range (that can also be called first region) in the second radio resource to which data of the second service is mapped, the range where the second radio resource overlaps with the first radio resource to which data of the first service can be mapped in a time axis direction, and can transmit the data. Note that the first service may be restated as, for example, first logical channel, first logical channel number, first section, first buffer, first transmission buffer, or the like. The second service may be restated as, for example, second logical channel, second logical channel number, second section, second buffer, second transmission buffer, or the like.

The reception device 20 illustrated in FIG. 1 is configured to be able to receive a radio frame in which schedulings in a plurality of different time units are mixed. In other words, the reception device 20 can perform wireless communication in a radio frame structure in which a first service in which first data is scheduled using a first radio resource in a first slot unit and a second service in which second data is scheduled using a second radio resource in a second slot unit having a longer time length than the first slot are mixed. The reception device 20 can receive a wireless signal transmitted from the transmission device 10 with changed transmission power of the first region in the second radio resource to which the data of the second service is mapped.

Figure 2:
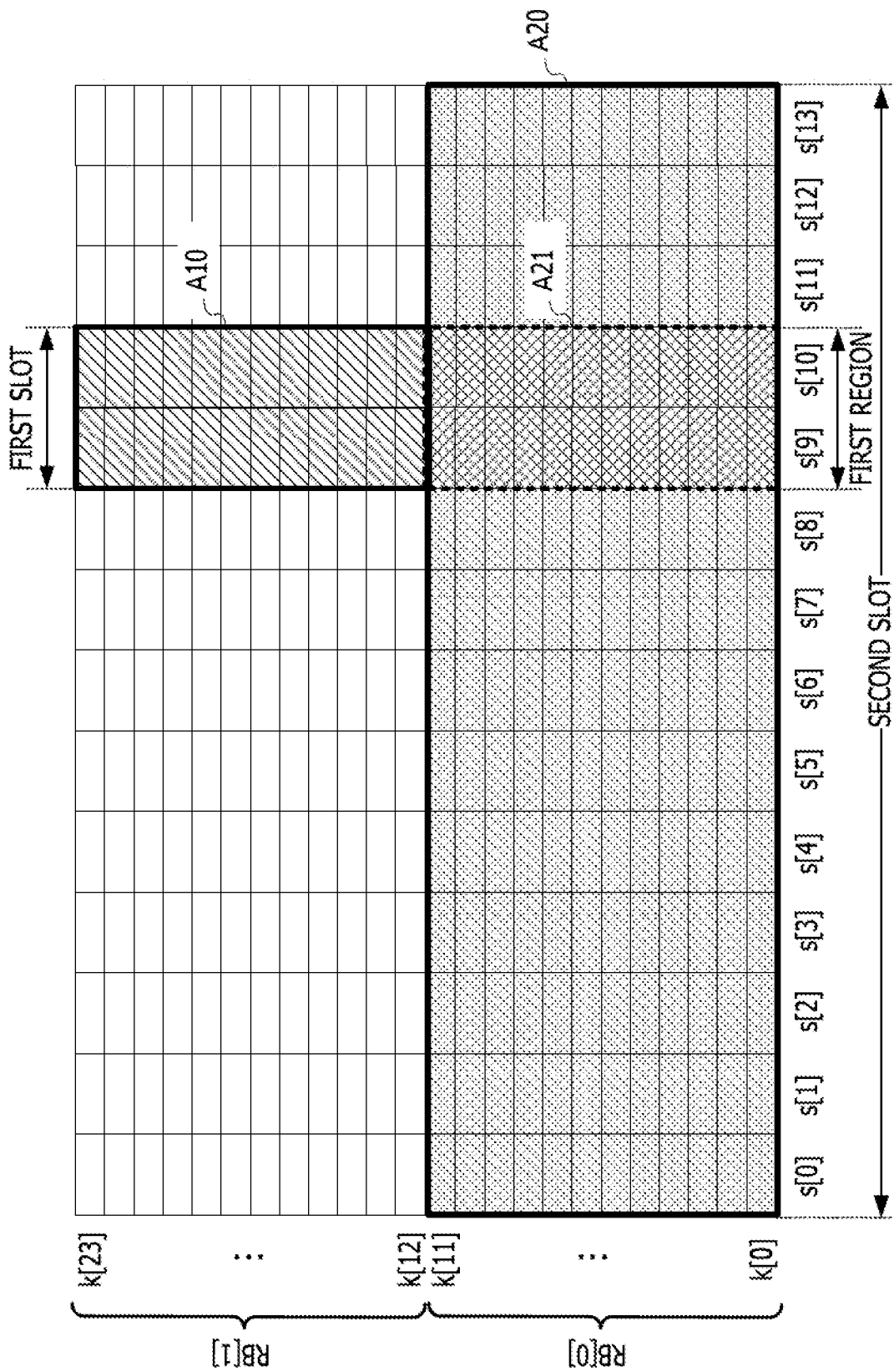
FIG. 2 is a diagram illustrating an example of arrangement of a first slot and a second slot in a radio frame structure in the wireless communication system according to Example 1.

FIG. 2 is a diagram illustrating an example of arrangement of the first slot and the second slot in the radio frame structure in the wireless communication system 1 according to Example 1. In the example illustrated in FIG. 2, a frequency axis is arranged in the vertical direction and a time axis is arranged in the horizontal direction. For example, in FIG. 2, a first resource block (RB[0]) is configured by twelve subcarriers (k[0] to k[11]) arranged in the frequency axis direction, and a second resource block (RB[1]) is configured by further twelve subcarriers (k[12] to k[23]). In the time axis direction in FIG. 2, fourteen symbols (s[0] to s[13]) are arranged.

In the example illustrated in FIG. 2, the first slot is configured by two symbols (s[9] and s[10]). In the first slot in FIG. 2, transmission data (that can also be called first data) of the first service is mapped to the second resource block (RB[1]). For convenience of description, the second resource block in the first slot is also called first radio resource (A10). Note that the first radio resource (A10) is an example of a radio resource to which transmission data of the first service can be mapped, and the transmission data of the first service is not necessarily actually mapped.

In the example illustrated in FIG. 2, the second slot is configured by fourteen symbols (s[0] and s[13]). In the second slot in FIG. 2, transmission data of the second service is mapped to the first resource block (RB[0]). For convenience of description, the first resource block in the first slot is also called second radio resource (A20).

As illustrated in FIG. 2, the second radio resource in the second slot includes a range (that can also be called first region) (A21) overlapping with the first radio resource to which the data of the first service can be mapped in the time axis direction.

In a conventional wireless communication system, transmission power control is executed in a uniform time unit (for example, a slot unit or a subframe unit including one or more slots). Therefore, in the conventional wireless communication system, the transmission power cannot be changed in the middle of the second radio resource (A20) to which the transmission data is mapped in the second slot unit, in the example illustrated in FIG. 2. As a result, in the conventional wireless communication system, total transmission power may exceed a maximum transmission power value in the first region where a plurality of radio resources in different scheduling time units overlap in the time axis direction.

The transmission device 10 according to Example 1 can suppress the total transmission power exceeding the maximum transmission power value by changing the transmission power in the first region in the second radio resource in the case where the first region is present in the second radio resource. Here, the first region is an example of the range overlapping with the first radio resource to which the transmission data (first data) is allocated according to a scheduling in a different time unit in the time axis direction, in the second radio resource to which the transmission data (second data) is allocated in the second slot unit.

Figure 3:
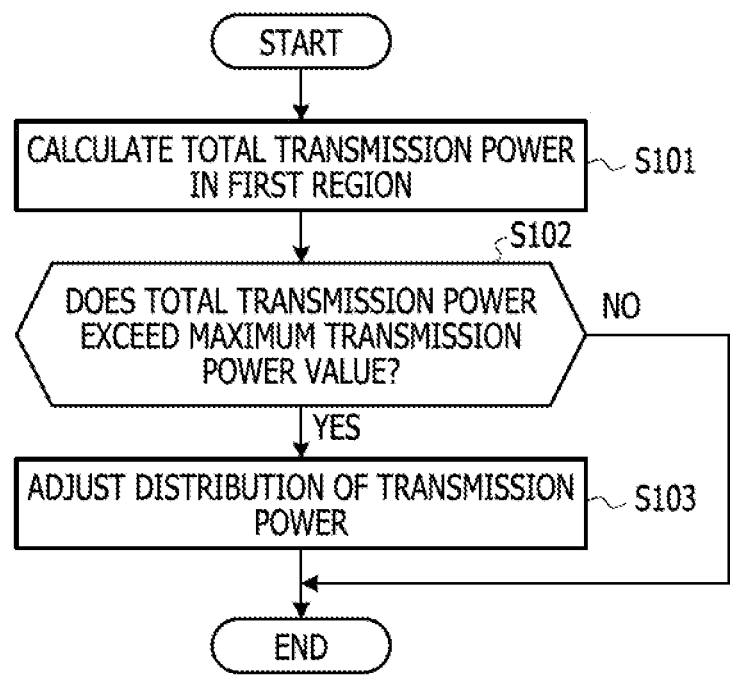
FIG. 3 is a diagram illustrating an example of a flow of processing in a transmission device of the wireless communication system according to Example 1.

FIG. 3 is a diagram illustrating an example of a flow of processing in the transmission device 10 of the wireless communication system 1 according to Example 1. The flow of the processing illustrated in FIG. 3 may be executed at arbitrary timing. For example, the transmission device 10 may execute the processing illustrated in FIG. 3 when the first radio resource scheduled in the first slot unit that is a time unit different from the second slot is allocated in the range (first region) overlapping with the second radio resource scheduled in the second slot unit on the time axis.

The transmission device 10 calculates total transmission power TP in the first region (S101). In S101, the transmission device 10 may calculate, for example, the total transmission power TP, which is a sum of the transmission power of the second radio resource and the transmission power of the first radio resource in the first region, in a symbol unit.

A specific example of S101 will be described with reference to the example illustrated in FIG. 2. In FIG. 2, the first radio resource in the first region includes two symbols (S[9] and s[10]) in the time axis direction and twelve subcarriers (k[12] to k[23]) in the frequency axis direction. In other words, the first radio resource in the first region is configured by twelve resource elements (which may also be called REs) per symbol and includes twenty-four resource elements in total. Furthermore, the second radio resource in the first region includes two symbols (S[9] and s[10]) in the time axis direction and twelve subcarriers (k[0] to k[11]) in the frequency axis direction. In other words, the second radio resource in the first region is configured by twelve resource elements per symbol and includes twenty-four resource elements in total. Therefore, in FIG. 2, the total transmission power TP in the symbol unit of the first radio resource and the second radio resource in the first region can be expressed by the total transmission power of the twenty-four resource elements. In other words, in S101, the transmission device 10 may acquire the total transmission power TP by totaling the transmission power in a resource element unit of the first radio resource and the second radio resource included in the first region. Note that the total transmission power TP may be calculated in the symbol unit or may be the total transmission power of the resource elements (forty-eight resource elements in the example in FIG. 2) in all the symbols included in the first region.

The description returns to FIG. 3. The transmission device 10 determines whether the total transmission power TP exceeds a predetermined value (that can also be called threshold or maximum transmission power value) (S102). In the case where the transmission device 10 determines in S102 that the total transmission power TP exceeds the maximum transmission power value (YES in S102), the transmission device 10 adjusts distribution of the transmission power in the first region (S103). On the other hand, in the case where the transmission device 10 determines in S102 that the transmission power TP does not exceed the maximum transmission power value (NO in S102), the transmission device 10 may terminate the processing without executing S103.

Figure 4:
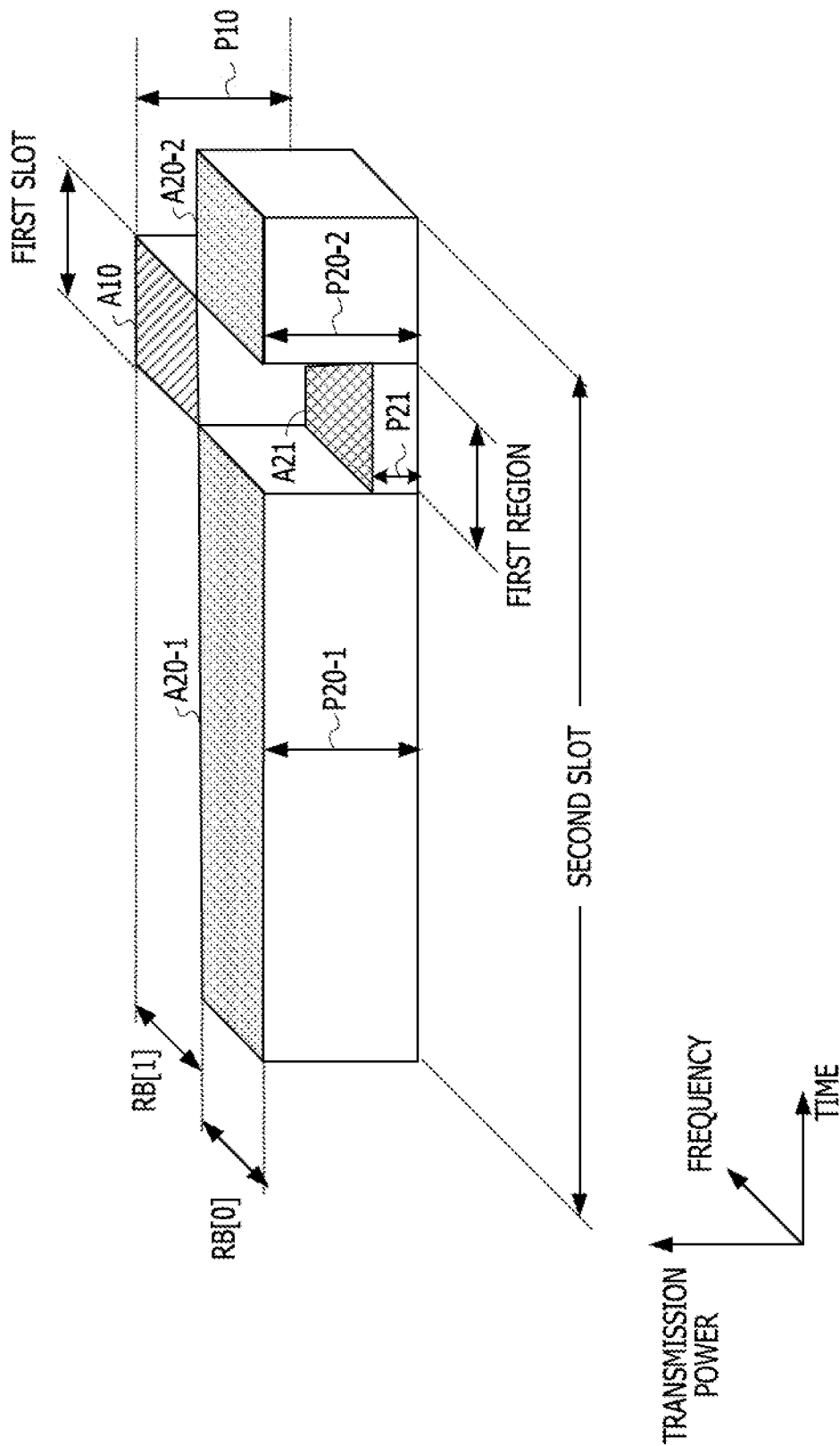
FIG. 4 is a diagram illustrating an example of transmission power distribution between a first radio resource and a second radio resource in the radio frame structure in the wireless communication system according to Example 1.

FIG. 4 is a diagram illustrating an example of transmission power distribution between the first radio resource and the second radio resource in the radio frame structure in the wireless communication system 1 according to Example 1. In FIG. 4, a transmission power axis is arranged in the vertical direction, the time axis is arranged in the horizontal direction, and the frequency axis is arranged in the depth direction. In other words, FIG. 4 illustrates a diagram in which the transmission power axis is added to the example illustrated in FIG. 2. For example, corresponding parts in both figures are given similar reference numerals.

In FIG. 4, first transmission power (P10) is allocated to the first radio resource (A10) to which the transmission power of the first service scheduled in the first slot unit is mapped. Moreover, in FIG. 4, the second radio resource (A20) to which the transmission power of the second service scheduled in the second slot unit is mapped includes portions (A20-1 and A20-2) to which second transmission power (P20-1 and P20-2) is allocated and a portion (A21) to which third transmission power (P21) is allocated. The third transmission power (P21) may be lower than the second transmission power (P20-1 and P20-2) as illustrated in FIG. 4. Note that the portion (A21) to which the third transmission power (P21) is allocated corresponds to the first region.

The third transmission power (P21) illustrated in FIG. 4 is an example of an adjustment result of the transmission power distribution in the first region by S103 in the flow of the processing illustrated in FIG. 3. The total transmission power TP in the first region is determined on the basis of a sum of the first transmission power (P10) of the first radio resource (A10) and the third transmission power (P21) of the second radio resource (A21) in the first region. Therefore, as illustrated in FIG. 4, the total transmission power exceeding the maximum transmission power value in the first region can be suppressed by reducing the transmission power in the second radio resource in the first region.

The above example is one of specific examples of the wireless communication system 1 according to Example 1.

According to one aspect of Example 1 disclosed above, the total transmission power in the first region in which the plurality of radio resources in different scheduling time units overlap in the time axis direction is adjusted. As a result, the total transmission power exceeding the maximum transmission power value can be suppressed in the radio frame in which schedulings in a plurality of different time units are mixed. As a result, wireless communication can be appropriately performed in the wireless communication system that allows the radio frame structure in which schedulings in a plurality of different time units are mixed. Such an effect is useful in implementing various wireless services such as eMBB, URLLC, and mMTC in the 5G system.

EXAMPLE 2

Example 2 illustrates another example of a wireless communication system 1 that allows a radio frame in which schedulings in a plurality of different time units are mixed. According to one aspect of the wireless communication system 1 of Example 2, a transmission device 10 inserts a known signal (that can also be called second known signal) to a first region of a second radio resource to which data (that can also be called second data) associated with a second service (that can also be called second logical channel, second logical channel number, second section, second buffer, or second transmission buffer) is mapped. According to one aspect of the wireless communication system 1 of Example 2, a reception device 20 extracts the second known signal from the first region of the second radio resource to which the second data of the second service is mapped, and decodes (that can also be called demodulates or decodes) a portion of the second radio resource in the first region on the basis of the second known signal, for example. According to one aspect of Example 2, wireless communication can be more appropriately performed in the radio frame structure in which schedulings in a plurality of different time units are mixed. Note that, in the present disclosure, the term "decoding" is a generic term for processes related to demodulation and decoding and may be replaced with a term such as demodulation, decoding, extraction, conversion, or the like.

Figure 5:
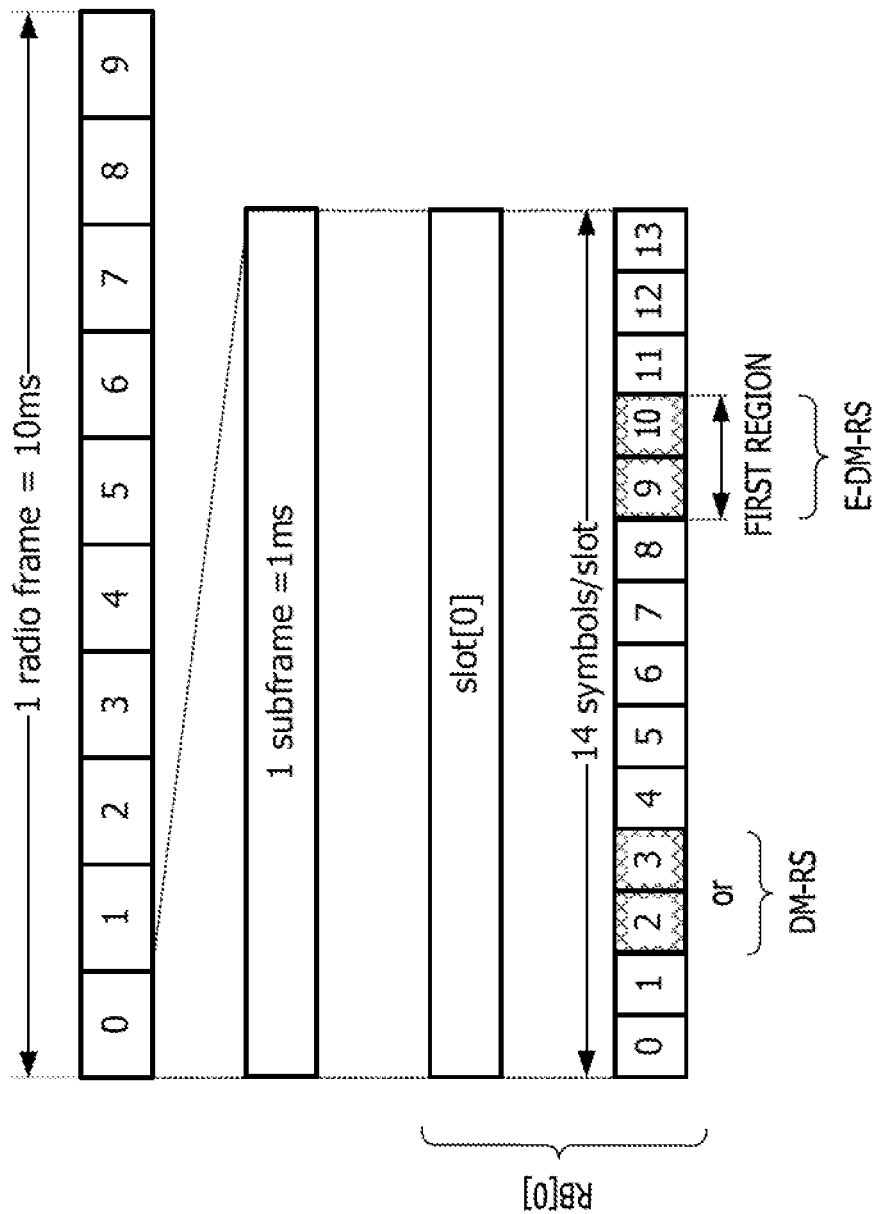
FIG. 5 is a diagram illustrating an example of arrangement of known signals in a radio frame structure of a wireless communication system according to Example 2.

FIG. 5 is a diagram illustrating an example of arrangement of known signals in the radio frame structure of a wireless communication system 1 according to Example 2. In FIG. 5, one radio frame has a time length of 10 ms (milliseconds) and includes 10 subframes.

One subframe has a time length of 1 ms, and may have a different internal structure according to settings such as a subcarrier time interval (subcarrier spacing (SCS)) (which can also be called numerology). For example, in the discussion regarding the standardization of the 5G system, one subframe with SCS of 15 kHz includes one slot, one subframe with SCS of 30 kHz includes two slots, one subframe with SCS of 60 kHz includes four slots, one subframe with SCS of 120 kHz includes eight slots, and one subframe with SCS of 240 kHz includes sixteen slots.

One subframe illustrated in FIG. 5 includes one slot (slot[0]). In other words, according to the trend of the discussion regarding the standardization of the 5G system, the radio frame structure illustrated in FIG. 5 may have the subcarrier spacing of 15 kHz.

The slot (slot[0]) illustrated in FIG. 5 is an example of the second slot, and is configured by, for example, fourteen symbols (s[0] to s[13]). A radio resource (that can also be called second radio resource) of a first resource block (RB[0]) is allocated to the fourteen symbols (s[0] to s[13]) of the second slot illustrated in FIG. 5 in a frequency axis direction. Here, the second radio resource is a radio resource to which transmission data (which can also be called second data) of the second service scheduled in a second slot unit can be mapped.

According to the trend of the discussion regarding the standardization of the 5G system, a known signal for demodulation (demodulation-reference signal (DM-RS), which can also be called first known signal) is arranged in either the third or fourth symbol (s[2] or s[3]) from the beginning of the second slot. For example, according to TS38.211 § 6.4.1.1.3 Mapping to physical resource, in the case of PUSCH mapping type A, the first known signal (DM-RS) is arranged in either the third or fourth symbol (s[2] or s[3]) from the beginning of the slot. Furthermore, according to TS38.211§ 7.4.1.1.2 Mapping to physical resources, in the case of PDSCH mapping type A, the first known signal (DM-RS) is arranged in either the third or fourth symbol (s[2] or s[3]) from the beginning of the slot. Transmission power of the first known signal (DM-RS) may be determined on the basis of transmission power allocated to resource elements included in the second slot, for example. Furthermore, detailed description of a signal sequence of the uplink first known signal (DM-RS) is given in TS38.211§ 6.4.1.1.1 Sequence generation, for example. Detailed description of a signal sequence of the downlink first known signal (DM-RS) is given in TS38.211§ 7.4.1.1.1 Sequence generation, for example. Note that the known signal may be called pilot signal to be described below.

In the example illustrated in FIG. 5, similarly to FIG. 2, the tenth and eleventh symbols (s[9] and s[10]) from the beginning of the second slot are included in the first region that is a range overlapping with the first slot by scheduling in a different time unit from the second slot in the time axis direction. In the wireless communication system 1 according to Example 2, a new known signal (enhanced-demodulation-reference signal (E-DM-RS), which can also be called second known signal) is inserted in a part or all of symbols included in the first region. Here, the first region is an example of a range in which the second radio resource scheduled in the second slot unit and the first radio resource scheduled in the first slot unit overlap in the time axis direction. The first radio resource is a radio resource to which transmission data (which can also be called first data) of a first service scheduled in the first slot unit can be mapped. The second radio resource is a radio resource to which transmission data (which can also be called second data) of the second service scheduled in the second slot unit can be mapped. Note that the name of the second known signal (E-DM-RS) is a coined word used in the present disclosure for convenience of description, and another name (for example, demodulation-reference signal (DM-RS), extended demodulation-reference signal (eDM-RS), user equipment-specific-reference signal (UE-Specific-RS), cell-specific-reference signal (Cell-Specific-RS), reference signal (RS), pilot signal (PS), phase-tracking reference signal (PT-RS), or the like) may be used in the standard in the 5G system, or the like.

A signal sequence of the second known signal (E-DM-RS) inserted to the symbols in the first region may be the same as or different from that of the first known signal (DM-RS) arranged in the symbols outside the first region. Transmission power allocated to the second known signal (E-DM-RS) inserted to the symbols in the first region may be the same as or different from that of the first known signal (DM-RS) arranged in the symbols outside the first region. Furthermore, the transmission power allocated to the second known signal (E-DM-RS) inserted to the symbols in the first region may be determined on the basis of the transmission power allocated to the resource elements included in the first region. For example, the transmission power allocated to the second known signal may be made the same as the transmission power allocated to the resource elements included in the first region, or a ratio of the aforementioned transmission powers may be set to a known value (a known value between a transmission device and a reception device).

Figure 6:
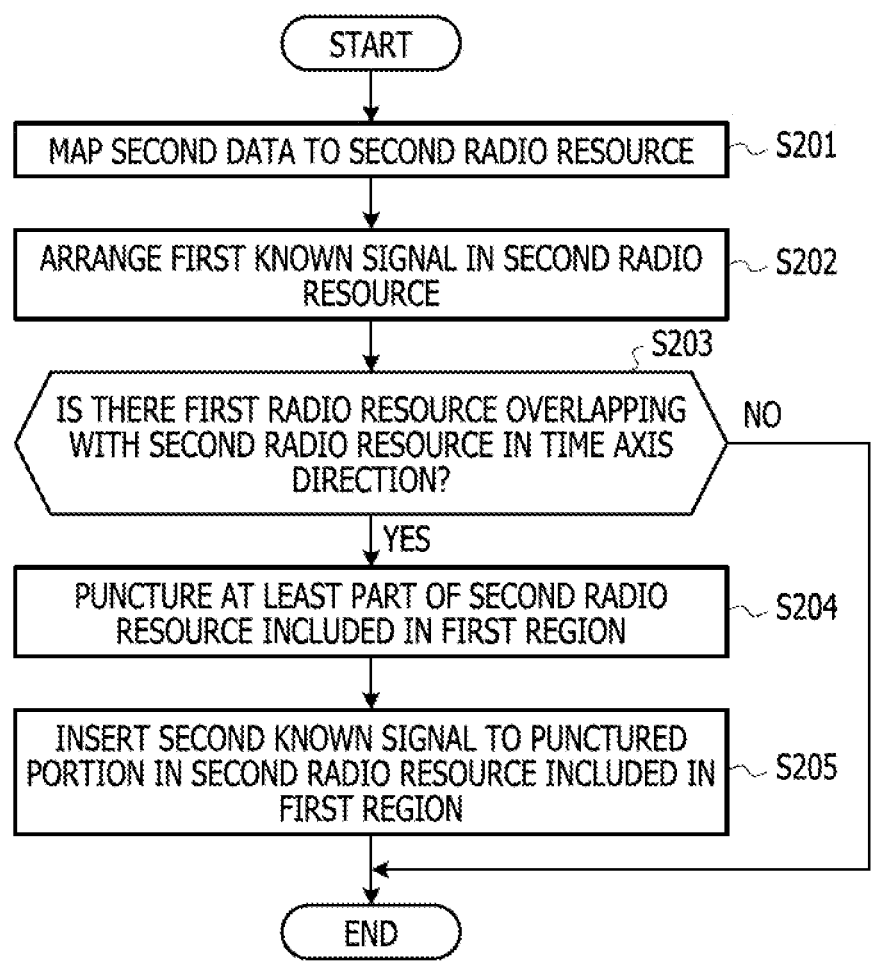
FIG. 6 is a diagram illustrating an example of a flow of processing in a transmission device of the wireless communication system according to Example 2.

FIG. 6 is a diagram illustrating an example of a flow of processing in a transmission device 10 of the wireless communication system 1 according to Example 2. The flow of the processing illustrated in FIG. 6 may be executed at arbitrary timing. For example, the transmission device 10 may execute the processing illustrated in FIG. 6 when the second radio resource is scheduled in the second slot unit.

The transmission device 10 maps the transmission data (that can also be called second data) of the second service to the second radio resource scheduled in the second slot unit (S201), and further arranges the known signal (that can also be called first known signal) having a predetermined signal sequence in a part of the second radio resource (S202). In S202, the first known signal may be a demodulation reference signal (DM-RS) that can be obtained when decoding (that may also be called decoding or demodulating) the second data from the second radio resource in a reception device 20, for example. The transmission device 10 may execute processing in S201 and processing in S202 in an arbitrary order. For example, the transmission device 10 may be configured to execute the processing in S201 after executing the processing in S202.

The transmission device 10 determines whether there is the first radio resource overlapping with the second radio resource in the time axis direction (S203). For example, in the case where there is allocation of the first radio resource scheduled in the first slot unit that is a time unit different from the second slot in the first region that is a region overlapping with the second radio resource in the time axis direction, the transmission device 10 may determine that there is the first radio resource in the first region (YES in S203). Furthermore, for example, in the case where the first radio resource is reserved in the first slot unit in the first region overlapping with the second radio resource in the time axis direction, the transmission device 10 may determine that there is the first radio resource in the first region (YES in S203). Furthermore, for example, in the case where there is no allocation of the first radio resource scheduled in the first slot unit that is a time unit different from the second slot and the first radio resource is not reserved in the first region that is a region overlapping with the second radio resource in the time axis direction, the transmission device 10 may determine that there is no first radio resource in the first region (NO in S203).

In the case where the transmission device 10 determines that there is the first radio resource in the first region overlapping with the second radio resource in the time axis direction (YES in S203), the transmission device 10 punctures at least a part of the second radio resource included in the first region (S204). In S204, the transmission device 10 may change the amount and position of puncturing according to the number of symbols included in the first region and the like. For example, the amount of puncturing may be increased in proportion to the number of symbols included in the first region. For example, the position of puncturing may be changed according to the radio quality of the second radio resource. Here, the radio quality of the second radio resource may be replaced with, for example, a modulation scheme to be applied to the second data mapped to the second radio resource. In general, the radio quality may be more favorable as the modulation scheme having a larger amount of information carried in one symbol is applied.

The transmission device 10 inserts the second known signal (E-DM-RS) to a punctured portion in the second radio resource included in the first region (S205). In S205, in the case of uplink, the transmission device 10 may generate a signal sequence of the second known signal (E-DM-RS) according to the procedure shown in TS38.211§ 6.4.1.1.1 Sequence generation, for example. In S205, in the case of downlink, the transmission device 10 may generate a signal sequence of the second known signal (E-DM-RS) according to the procedure shown in TS38.211§ 7.4.1.1.1 Sequence generation, for example.

On the other hand, in the case where the transmission device 10 determines that there is no first radio resource in the first region overlapping with the second radio resource in the time axis direction (NO in S203), the transmission device 10 may skip the processing in S204 and S205 without executing the processing.

The above flow is an example of a flow of processing in the transmission device 10 of the wireless communication system 1 according to Example 2 illustrated in FIG. 6. Note that the flow of the processing illustrated in FIG. 3 may be combined with the flow of the processing illustrated in FIG. 6. For example, the processing in S101 to S103 illustrated in FIG. 3 may be executed at arbitrary timing after the determination of YES in S203.

Figure 7:
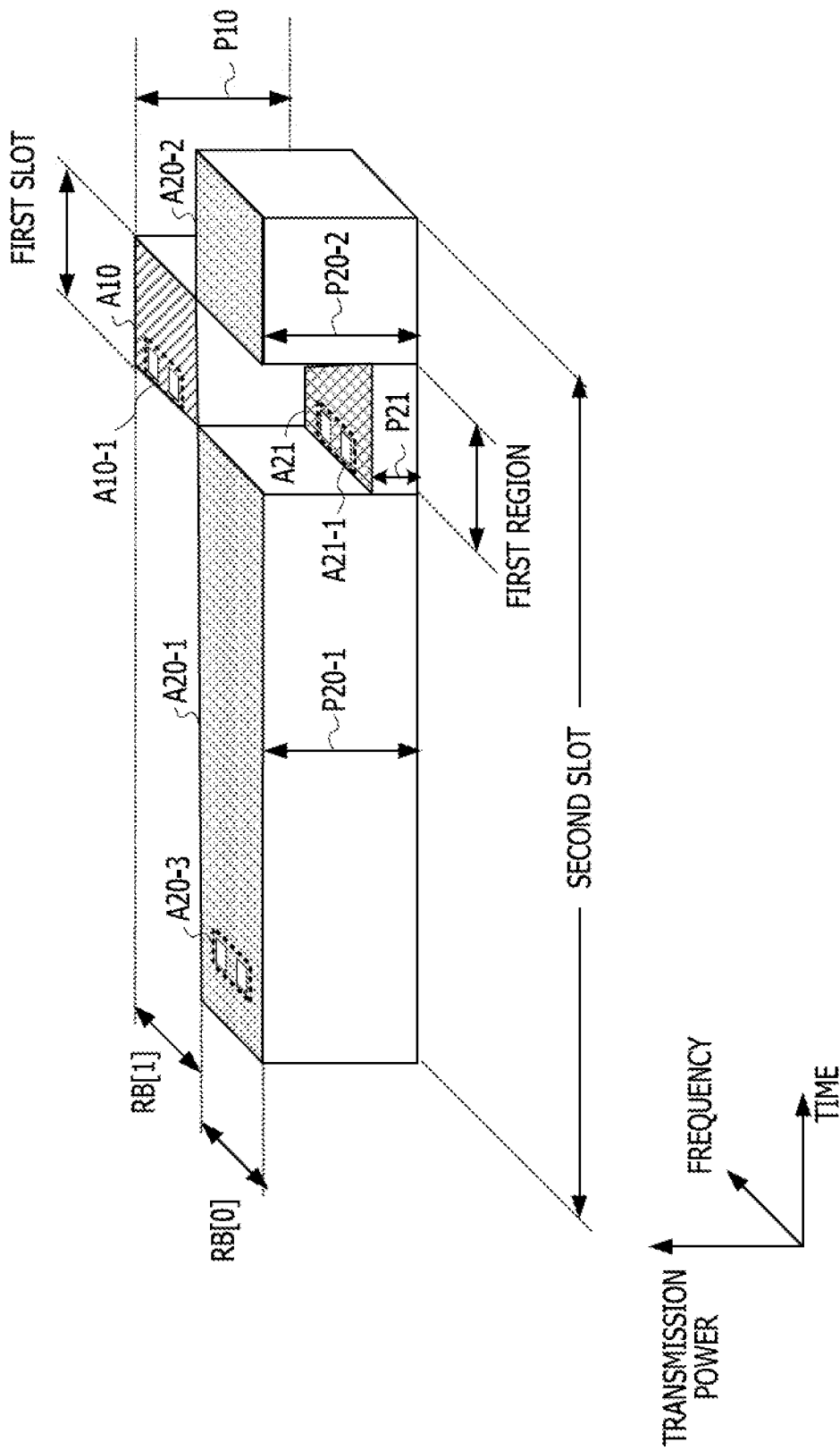
FIG. 7 is a diagram illustrating an example of transmission power distribution between a first radio resource and a second radio resource and arrangement of known signals in the radio frame structure in the wireless communication system according to Example 2.

FIG. 7 is a diagram illustrating an example of transmission power distribution between the first radio resource and the second radio resource and arrangement of the known signals in the radio frame structure in the wireless communication system 1 according to Example 2. In FIG. 7, a transmission power axis is arranged in the vertical direction, a time axis is arranged in the horizontal direction, and a frequency axis is arranged in the depth direction. In other words, FIG. 7 illustrates a diagram in which the transmission power axis and the frequency axis are added to the example illustrated in FIG. 5.

In FIG. 7, first transmission power (P10) is allocated to the first radio resource (A10) to which the transmission data (first data) of the first service scheduled in the first slot unit is mapped. Moreover, in FIG. 7, the second radio resource (A20) to which the transmission data (second data) of the second service scheduled in the second slot unit is mapped includes portions (A20-1 and A20-2) to which second transmission power (P20-1 and P20-2) is allocated and a portion (A21) to which third transmission power (P21) is allocated. The third transmission power (P21) may be lower than the second transmission power (P20-1 and P20-2) as illustrated in FIG. 7. The third transmission power (P21) illustrated in FIG. 7 is an example of an adjustment result of the transmission power distribution in the first region by S103 in the flow of the processing in the transmission device 10 according to Example 1 illustrated in FIG. 3, for example. Total transmission power TP in the first region may be determined on the basis of a sum of the first transmission power (P10) of the first radio resource (A10) and the third transmission power (P21) of the second radio resource (A21) in the first region. As illustrated in FIG. 7, the total transmission power exceeding a maximum transmission power value in the first region can be suppressed by reducing the transmission power in the second radio resource in the first region.

In FIG. 7, the known signal (A10-1) is arranged in a part of the first radio resource (A10) scheduled in the first slot unit shorter than the second slot. For example, according to TS38.211§ 6.4.1.1.3 Mapping to physical resource, in the case of PUSCH mapping type B, the first known signal (A10-1) in the first radio resource (A10) can be arranged in the first symbol (s[9] in FIG. 5) from the beginning of the slot. Furthermore, according to TS38.211§ 7.4.1.1.2 Mapping to physical resources, in the case of PDSCH mapping type B, the first known signal (A10-1) in the first radio resource (A10) is arranged in the first symbol (s[9] in FIG. 5) from the beginning of the slot. The transmission power of the known signal (A10-1) arranged in the first radio resource (A10) may be determined on the basis of the transmission power allocated to the first radio resource (A10), for example. Furthermore, detailed description of the signal sequence of the uplink known signal (A10-1) is given in TS38.211§ 6.4.1.1.1 Sequence generation, for example. Furthermore, detailed description of the signal sequence of the downlink known signal (A10-1) is given in TS38.211§ 7.4.1.1.1 Sequence generation, for example.

In FIG. 7, the known signal (A20-3) (that can also be called first known signal) is arranged in the second radio resource (A20) scheduled in the second slot unit longer than the first slot. For example, according to TS38.211§ 6.4.1.1.3 Mapping to physical resource, in the case of PUSCH mapping type A, the first known signal (A20-3) can be arranged in either the third or fourth symbol (s[2] or s[3]) from the beginning of the slot. Furthermore, according to TS38.211§ 7.4.1.1.2 Mapping to physical resources, in the case of PDSCH mapping type A, the first known signal (A20-3) can be arranged in either the third or fourth symbol (s[2] or s[3]) from the beginning of the slot. The transmission power of the first known signal (A20-3) arranged in the second radio resource (A20) may be determined on the basis of the transmission power (P20-1 and P20-2) allocated to the second radio resource (A20), for example.

In FIG. 7, the second known signal (that can also be called E-DM-RS) (A21-1) is inserted to the portion (A21) to which the third transmission power (P21) is allocated in the second radio resource (A20) scheduled in the second slot unit. The transmission power of the second known signal (A21-1) may be determined on the basis of the third transmission power (P21) allocated to the portion (A21) corresponding to the first region in the second radio resource (A20). For example, the transmission power of the second known signal (A21-1) may be made the same as the third transmission power (P21), or a ratio of the aforementioned transmission powers may be set to a known value (a known value between the transmission device and the reception device).

Figure 8:
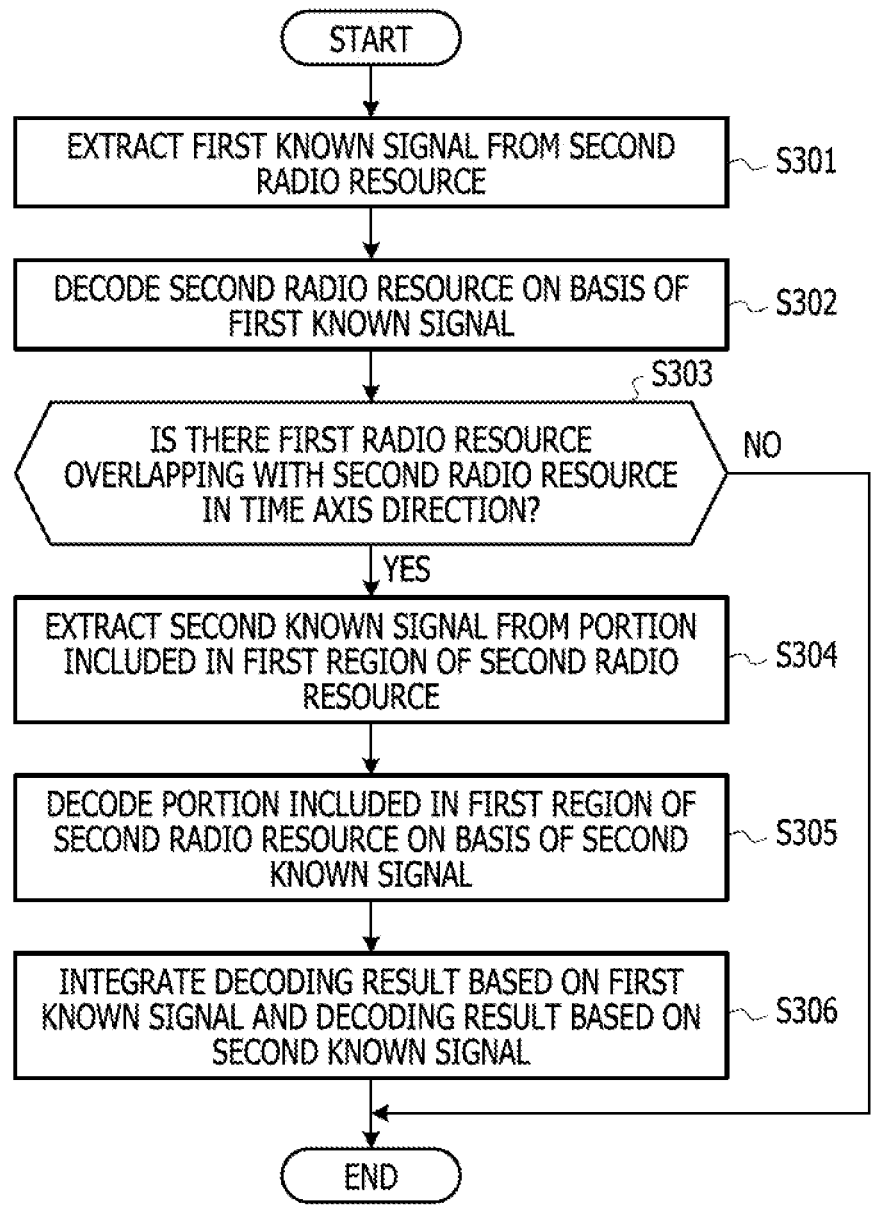
FIG. 8 is a diagram illustrating an example of a flow of processing in a reception device of the wireless communication system according to Example 2.

FIG. 8 is a diagram illustrating an example of a flow of processing in the reception device 20 of the wireless communication system 1 according to Example 2. The flow of the processing illustrated in FIG. 8 may be executed at arbitrary timing. For example, the reception device 20 may execute the processing in FIG. 8 when a wireless signal corresponding to the second radio resource scheduled in the second slot unit longer than the first slot is received.

The reception device 20 extracts the first known signal from the second radio resource (S301) and decodes the second radio resource on the basis of the extracted first known signal (S302). In S302, the reception device 20 may not be able to determine whether the second radio resource includes the second known signal. In other words, in the case where the second radio resource includes the second known signal, the reception device 20 may try to decode transmission data (that can also be called second data) of the second service mapped in the second radio resource from the resource element in which the second known signal is arranged in S302. In that case, the reception device 20 may fail in decoding the second data mapped to the second radio resource.

The reception device 20 determines whether there is the first radio resource in a range (that can also be called first region) overlapping with the second radio resource in the time axis direction (S303). In S303, the reception device 20 may determine whether having received data of the first service (which can also be called first data) using the first radio resource included in the first region. For example, the reception device 20 may try to decode the data of the first service (first data) that may have been mapped in the first radio resource scheduled in the first slot unit shorter than the second slot. As a result, in the case where the decoding of the first data is successful, the reception device 20 may determine that there is the first radio resource in the first region (YES in S303). On the other hand, in the case where the decoding of the first data fails, the reception device 20 may determine that there is no the first radio resource in the first region (NO in S303).

In the case where the reception device 20 determines that there is no first radio resource in the first region (NO in S303), the reception device 20 may adopt a decoding result (a result in S302) of the second radio resource based on the first known signal as a decoding result of the second radio resource and terminate the processing illustrated in FIG. 8.

On the other hand, in the case where the reception device 20 determines that there is the first radio resource in the first region (YES in S303), the reception device 20 extracts the second known signal from the portion of the second radio resource included in the first region (S304). The first region may be, for example, a range in which the first radio resource and the second radio resource overlap in the time axis direction. In S304, the reception device 20 may specify the arrangement (the number and position) of the second known signals according to the number of symbols included in the first region and the like. For example, the arrangement may be set such that the number of second known signals increases in proportion to the number of symbols included in the first region. For example, the arrangement may be set such that the position of the second known signal and/or the number of the second known signals may be different according to the radio quality of the second radio resource. Here, the radio quality of the second radio resource may be replaced with, for example, a modulation scheme to be applied to the second data mapped to the second radio resource. In general, the radio quality may be more favorable as the modulation scheme having a larger amount of information carried in one symbol is applied.

The reception device 20 decodes the portion of the second radio resource included in the first region on the basis of the extracted second known signal (S305). In S305, the reception device 20 can exclude, from a decoding target, the portion of the second radio resource included in the first region, the portion corresponding to the second known signal. Then, the reception device 20 integrates a decoding result based on the first known signal (a result of S302) and a decoding result based on the second known signal (a result of S305) (S306). Thereby, it is avoided that the reception device 20 tries to decode transmission data (that can also be called second data) of the second service mapped in the second radio resource from the resource element in which the second known signal is arranged. As a result, the reception device 20 can successfully decode the second radio resource.

Furthermore, in the case where the transmission power of the second radio resource in the first region is reduced, the reception device 20 may fail in decoding the second radio resource in the first region if using the first known signal arranged on the basis of the transmission power before the reduction in the transmission power in the first region is executed. Such an event is remarkable when the modulation scheme to be applied to the second radio resource is quadrature amplitude modulation. In the quadrature amplitude modulation scheme, a signal point indicating a predetermined bit string is allocated to a combination of a phase and amplitude of a signal. Therefore, it may be difficult to appropriately specify the signal point as the transmission power is changed. Even in such a case, the reception device 20 can obtain the reference of the transmission power allocated to the second radio resource in the first region according to the second known signal inserted in the first region. Therefore, the reception device 20 can appropriately decode the second radio resource in the first region with the reduced transmission power.

The above flow is an example of a flow of processing in the reception device 20 of the wireless communication system 1 according to Example 2 illustrated in FIG. 8.

Figure 9:
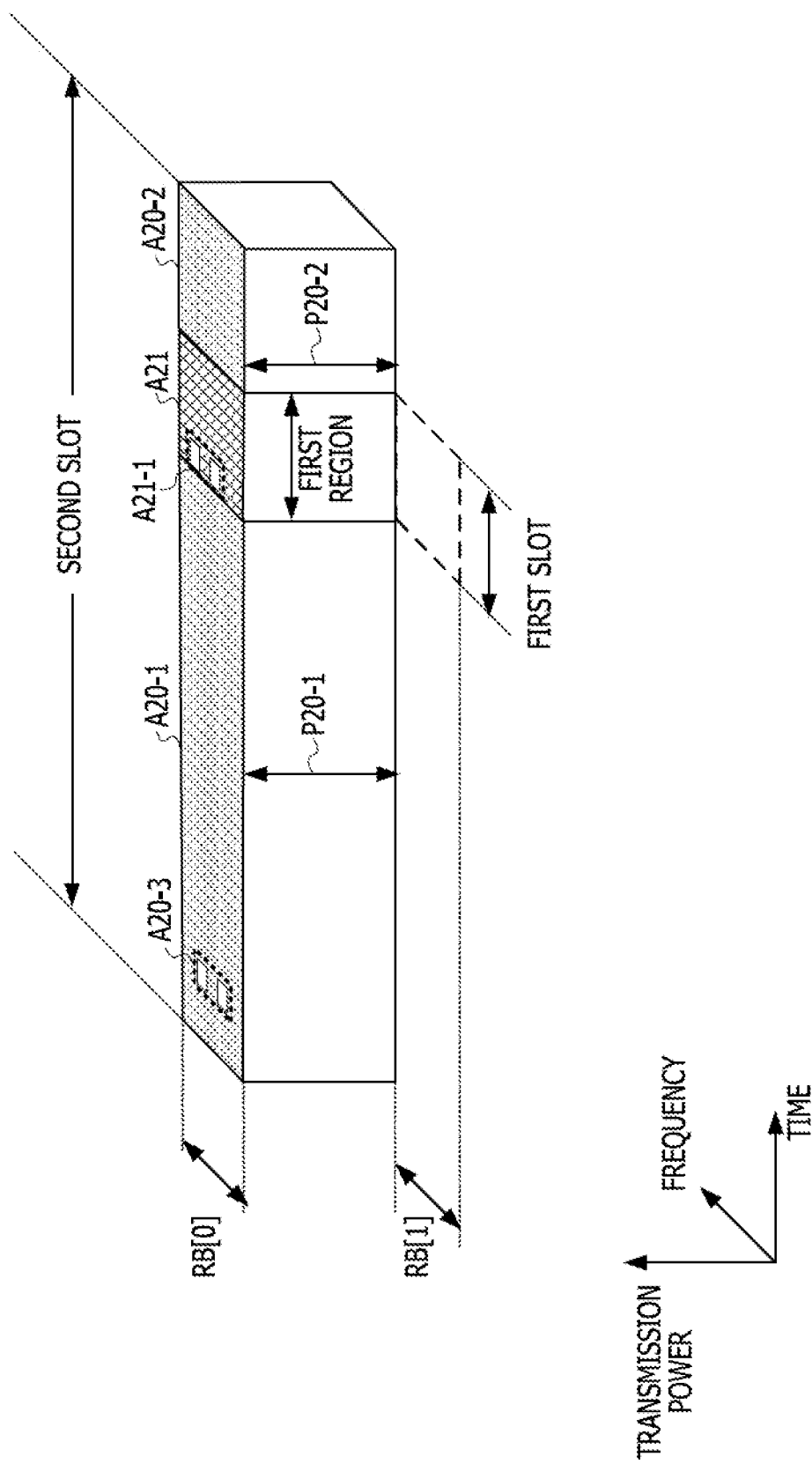
FIG. 9 is a diagram illustrating another example of transmission power distribution between a first radio resource and a second radio resource and arrangement of known signals in the radio frame structure in the wireless communication system according to Example 2.

FIG. 9 is a diagram illustrating another example of transmission power distribution between the first radio resource and the second radio resource and arrangement of the known signals in the radio frame structure in the wireless communication system according to Example 2. In FIG. 9, the transmission power axis is arranged in the vertical direction, the time axis is arranged in the horizontal direction, and the frequency axis is arranged in the depth direction. In other words, FIG. 9 illustrates a diagram in which the transmission power axis and the frequency axis are added to the example illustrated in FIG. 5.

In FIG. 9, the first radio resource (A10) is reserved for the data of the first service scheduled in the first slot unit, but a state where no data is mapped to the first radio resource (A10) is illustrated.

Meanwhile, the second transmission power (P20-1) is allocated to the second radio resource (A20) to which the data of the second service scheduled in the second slot unit is mapped, in the range of the second slot. In other words, the second transmission power (P20-1) is allocated to the portion (A20-1) before the first region, the portion (A21) of the first region, and the portion (A20-2) after the first region, in the second radio resource (A20) illustrated in FIG. 9.

In FIG. 9, the first known signal (A20-3) is arranged in the second radio resource (A20) scheduled in the second slot unit longer than the first slot. For example, according to TS38.211§ 6.4.1.1.3 Mapping to physical resource, in the case of PUSCH mapping type A, the first known signal (A20-3) can be arranged in either the third or fourth symbol (s[2] or s[3]) from the beginning of the slot. Furthermore, according to TS38.211§7.4.1.1.2 Mapping to physical resources, in the case of PDSCH mapping type A, the first known signal (A20-3) can be arranged in either the third or fourth symbol (s[2] or s[3]) from the beginning of the slot. The transmission power of the first known signal (A20-3) arranged in the second radio resource (A20) may be determined on the basis of the transmission power (P20-1) allocated to the second radio resource (A20), for example.

In FIG. 9, the second known signal (that can also be called E-DM-RS) (A21-1) is inserted to the portion (A21) to which the third transmission power (P21) is allocated in the second radio resource (A20) scheduled in the second slot unit. The transmission power of the second known signal (A21-1) may be determined on the basis of the second transmission power (P20-1) allocated to the portion (A21) corresponding to the first region in the second radio resource (A20), for example. In this case, the transmission power of the second known signal (A21-1) may be the same as the transmission power allocated to the first known signal (A20-3).

Figure 10:
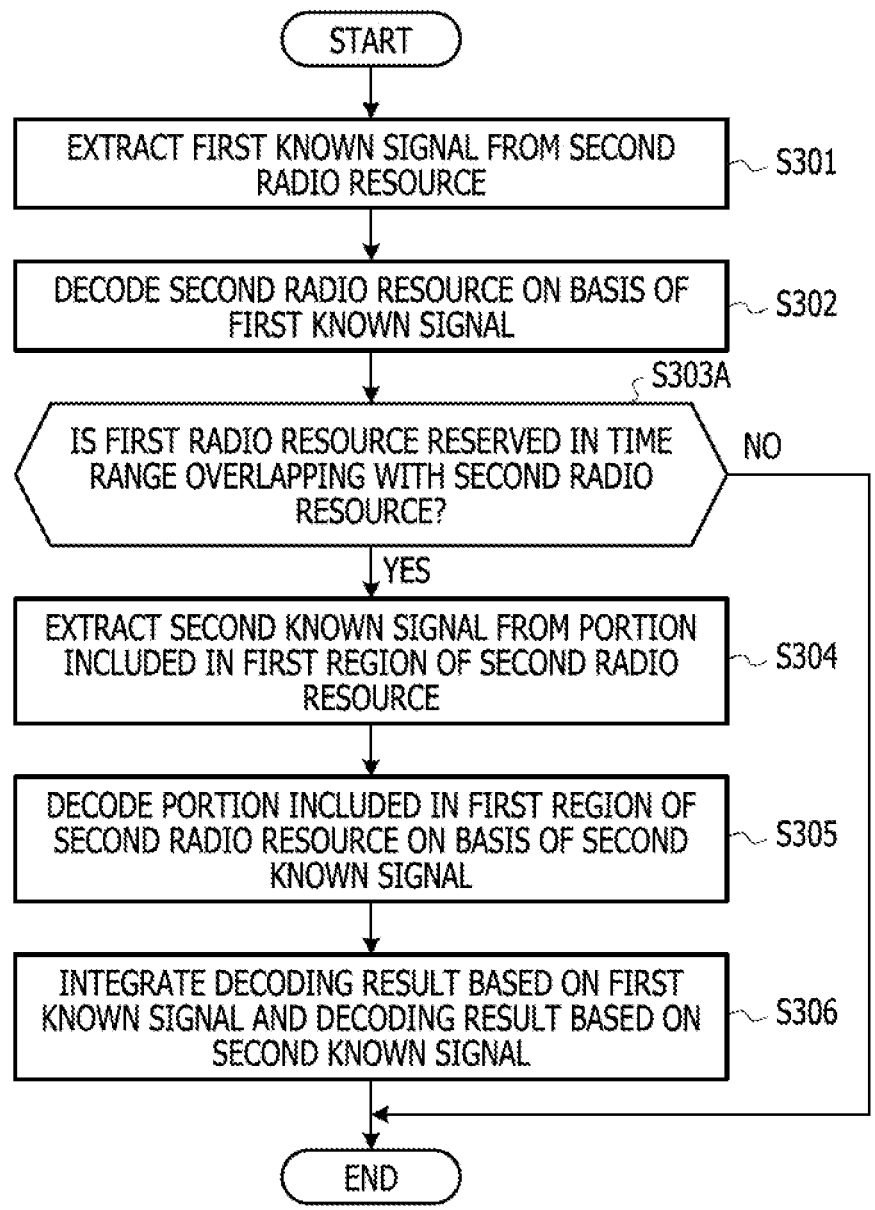
FIG. 10 is a diagram illustrating another example of the flow of the processing in the reception device of the wireless communication system according to Example 2.

FIG. 10 is a diagram illustrating another example of the flow of the processing in the reception device of the wireless communication system according to Example 2. The flow of the processing illustrated in FIG. 10 may be executed at arbitrary timing. For example, the reception device 20 may execute the processing in FIG. 10 when the wireless signal corresponding to the second radio resource scheduled in the second slot unit longer than the first slot is received. Note that, in FIG. 10, similar parts to those in FIG. 8 are given the same reference numerals.

The reception device 20 extracts the first known signal from the second radio resource (S301) and decodes the second radio resource on the basis of the extracted first known signal (S302). In S302, the reception device 20 may not be able to determine whether the second radio resource includes the second known signal. In other words, in the case where the second radio resource includes the second known signal, the reception device 20 may try to decode transmission data (that can also be called second data) of the second service mapped in the second radio resource from the resource element in which the second known signal is arranged in S302. In that case, the reception device 20 may fail in decoding the second data mapped to the second radio resource, similarly to the example illustrated in FIG. 8.

The reception device 20 determines whether the first radio resource is reserved in a time range (that can also be called first region) in which the first radio resource overlaps with the second radio resource in the time axis direction (S303A). In S303A, the reception device 20 may determine YES in 5303A in the case where the first radio resource is reserved in the time range overlapping the second radio resource in the time axis direction. On the other hand, the reception device 20 may determine NO in 5303A in the case where the first radio resource is not reserved in the time range overlapping the second radio resource in the time axis direction. In 5303A, the reception device 20 can complete the decoding of the second radio resource without waiting for a decoding result of the first radio resource overlapping with the second radio resource in the time axis direction. Therefore, the reception device 20 can complete the processing illustrated in FIG. 10 earlier than the processing illustrated in FIG. 8. Note that S303A in FIG. 10 is an example of the determination processing in S303 in FIG. 8. In other words, in S303A in FIG. 10, whether there is the first radio resource in the first region is determined by determining whether the first radio resource is reserved in the time range (first region) overlapping with the second radio resource in the time axis direction.

In the case where the reception device 20 determines that the first radio resource is not reserved in the first region (NO in S303A), the reception device 20 may adopt a decoding result (a result in S302) of the second radio resource based on the first known signal as a decoding result of the second radio resource and terminate the processing illustrated in FIG. 10.

In the case where the reception device 20 determines that the first radio resource is reserved in the time range overlapping with the second radio resource (YES in 5303A), the reception device 20 extracts the second known signal from the portion of the second radio resource included in the first region (S304). The first region may be, for example, a range in which the first radio resource and the second radio resource overlap in the time axis direction. In S304, the reception device 20 may specify the arrangement (the number and position) of the second known signals according to the number of symbols included in the first region and the like. For example, the arrangement may be set such that the number of second known signals increases in proportion to the number of symbols included in the first region. For example, the arrangement may be set such that the position of the second known signal and/or the number of the second known signals may be different according to the radio quality of the second radio resource. Here, the radio quality of the second radio resource may be replaced with, for example, a modulation scheme to be applied to the second data mapped to the second radio resource. In general, the radio quality may be more favorable as the modulation scheme having a larger amount of information carried in one symbol is applied.

The reception device 20 decodes the portion of the second radio resource included in the first region on the basis of the extracted second known signal (S305). In S305, the reception device 20 can exclude, from a decoding target, the portion of the second radio resource included in the first region, the portion corresponding to the second known signal. Then, the reception device 20 integrates a decoding result based on the first known signal (a result of S302) and a decoding result based on the second known signal (a result of S305) (S306). Thereby, it is avoided that the reception device 20 tries to decode transmission data (that can also be called second data) of the second service mapped in the second radio resource from the resource element in which the second known signal is arranged. As a result, the reception device 20 can successfully decode the second radio resource.

The above flow is an example of a flow of processing in the reception device 20 of the wireless communication system 1 according to Example 2 illustrated in FIG. 10.

According to one aspect of Example 2 disclosed above, the transmission device 10 can insert the second known signal in the first region in which a plurality of radio resources in different scheduling time units overlaps in the time axis direction. Thereby, the transmission device 10 according to Example 2 can appropriately transmit the second radio resource on the basis of the first known signal and the second known signal in the radio frame in which schedulings in a plurality of different time units are mixed. As a result, the wireless communication system 1 according to Example 2 can appropriately perform wireless communication while allowing the radio frame structure in which schedulings in a plurality of different time units are mixed. Such an effect is useful in implementing various wireless services such as eMBB, URLLC, and mMTC in the 5G system.

According to another aspect of Example 2 disclosed above, the reception device 20 extracts the second known signal in the first region in which a plurality of radio resources in different scheduling time units overlaps in the time axis direction. Thereby, the reception device 20 according to Example 2 can appropriately decode the second radio resource on the basis of the first known signal and the second known signal in the radio frame in which schedulings in a plurality of different time units are mixed. As a result, the wireless communication system 1 according to Example 2 can appropriately perform wireless communication while allowing the radio frame structure in which schedulings in a plurality of different time units are mixed. Such an effect is useful in implementing various wireless services such as eMBB, URLLC, and mMTC in the 5G system.

EXAMPLE 3

Example 3 illustrates a wireless communication system 1 that allows a radio frame in which schedulings in a plurality of different time units are mixed. According to one aspect of the wireless communication system 1 of Example 3, a transmission device 10 controls whether to insert a second known signal to a second radio resource according to a modulation scheme to be applied to second data of a second wireless service. According to one aspect of the wireless communication system 1 of Example 3, a reception device 20 controls whether to extract the second known signal from the second radio resource according to the modulation scheme to be applied to the second data of the second wireless service. According to one aspect of Example 3, wireless communication can be more appropriately performed in the radio frame structure in which schedulings in a plurality of different time units are mixed.

Figure 11:
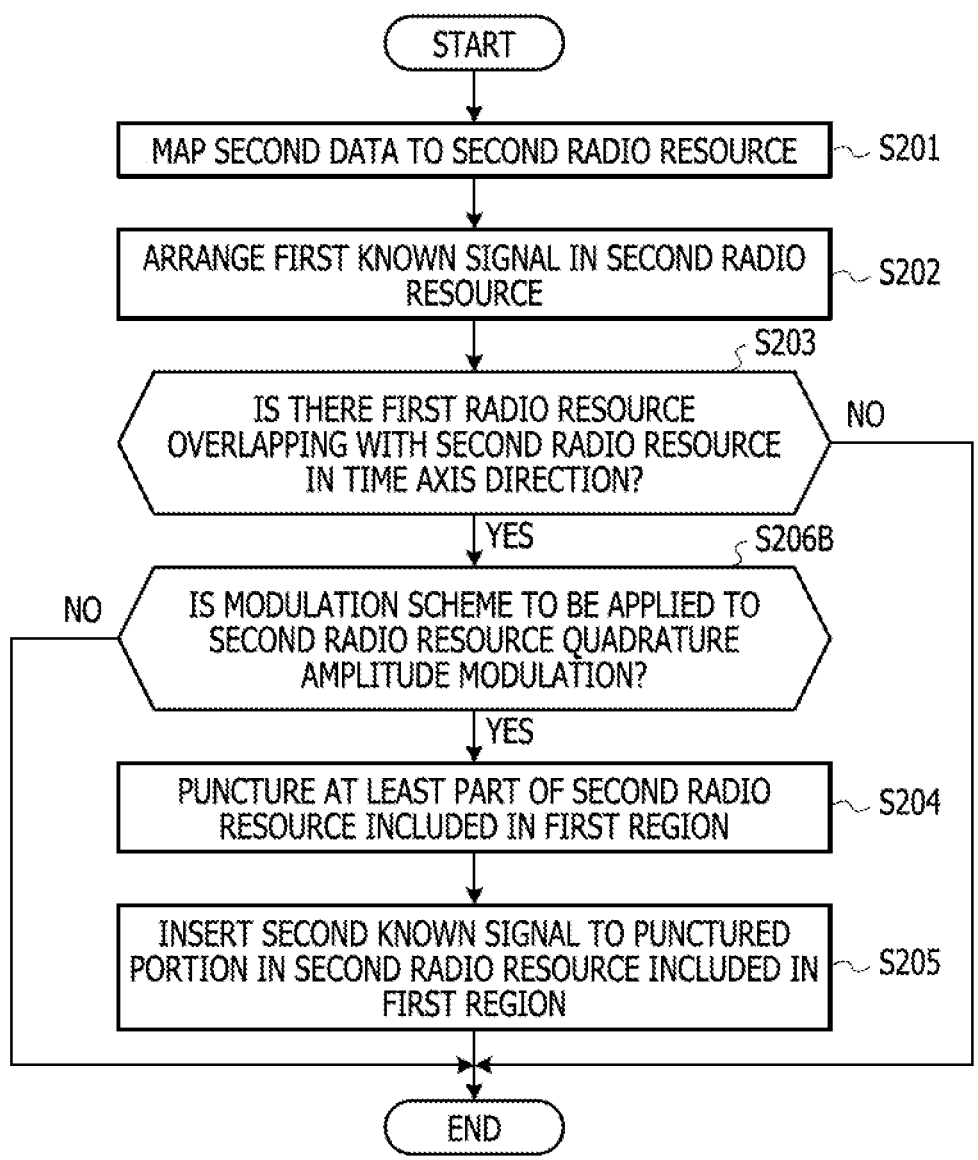
FIG. 11 is a diagram illustrating an example of a flow of processing in a transmission device of a wireless communication system according to Example 3.

FIG. 11 is a diagram illustrating an example of a flow of processing in the transmission device 10 of the wireless communication system according to Example 3. The flow of the processing illustrated in FIG. 11 may be executed at arbitrary timing. For example, in the transmission device 10, the processing illustrated in FIG. 11 may be executed when the second radio resource is scheduled in a second slot unit.

The transmission device 10 maps transmission data (that can also be called second data) of the second service to the second radio resource scheduled in a second slot unit (S201), and further arranges a known signal (that can also be called first known signal) having a predetermined signal sequence in a part of the second radio resource (S202). In S202, the first known signal may be a demodulation reference signal (DM-RS) that can be obtained when the reception device 20 decodes the second data from the second radio resource, for example. The transmission device 10 may execute processing in S201 and processing in S202 in an arbitrary order. For example, the transmission device 10 may be configured to execute the processing in S201 after executing the processing in S202.

The transmission device 10 determines whether there is a first radio resource in a time range (that can also be called first region) overlapping with the second radio resource in a time axis direction (S203). For example, in the case where there is allocation of the first radio resource scheduled in the first slot unit that is a time unit different from the second slot in the first region that is a region overlapping with the second radio resource in the time axis direction, the transmission device 10 may determine that there is the first radio resource in the first region (YES in S203). Furthermore, for example, in the case where the first radio resource is reserved in the first slot unit in the first region overlapping with the second radio resource in the time axis direction, the transmission device 10 may determine that there is the first radio resource in the first region (YES in S203). Furthermore, for example, in the case where there is no allocation of the first radio resource scheduled in the first slot unit that is a time unit different from the second slot and the first radio resource is not reserved in the first region that is a region overlapping with the second radio resource in the time axis direction, the transmission device 10 may determine that there is no first radio resource in the first region (NO in S203).

In the case where the transmission device 10 determines that there is the first radio resource in the first region overlapping with the second radio resource in the time axis direction (YES in S203), the transmission device 10 determines whether the modulation scheme to be applied to the second radio resource is quadrature amplitude modulation (QAM) (S206B).

In S206B, the transmission device 10 may determine that the modulation scheme is quadrature amplitude modulation in the case where the modulation scheme to be applied to the second radio resource is any of 16QAM (4 bits/symbols), 64QAM (6 bits/symbols), 256QAM (8 bits/symbols), or 1024QAM (10 bits/symbols) (YES in S206B), for example. Meanwhile, in S206B, the transmission device 10 may determine that the modulation scheme is not the quadrature amplitude modulation in the case where the modulation scheme to be applied to the second radio resource is either binary phase shift keying (BPSK, which can also be called two-phase shift keying (2PSK)) (1 bit/symbol) or quadrature phase shift keying (QPSK, which can also be called 4PSK) (2 bits/symbols) (NO in S206B), for example. Note that quadrature amplitude modulation in the present disclosure is an example of a technology of transmitting information of a plurality of bits per symbol by a combination of a phase and an amplitude. Such a modulation scheme may be called, for example, amplitude phase shift keying (APSK).

In the case where the transmission device 10 determines that the modulation scheme to be applied to the second radio resource is the quadrature amplitude modulation (YES in S206B), the transmission device 10 punctures at least a part of the second radio resource included in the first region (S204). In S204, the transmission device 10 may change the amount and position of puncturing according to the number of symbols included in the first region and the like. For example, the amount of puncturing may be increased in proportion to the number of symbols included in the first region. For example, the position of puncturing may be changed according to the radio quality of the second radio resource. Here, the radio quality of the second radio resource may be replaced with, for example, a modulation scheme to be applied to the second data mapped to the second radio resource. In general, the radio quality may be more favorable as the modulation scheme having a larger amount of information carried in one symbol is applied.

The transmission device 10 inserts the second known signal (E-DM-RS) to a punctured portion in the second radio resource included in the first region (S205). In S205, in the case of uplink, the transmission device 10 may generate a signal sequence of the second known signal (E-DM-RS) according to the procedure shown in TS38.211§ 6.4.1.1.1 Sequence generation, for example. In S205, in the case of downlink, the transmission device 10 may generate a signal sequence of the second known signal (E-DM-RS) according to the procedure shown in TS38.211§ 7.4.1.1.1 Sequence generation, for example.

On the other hand, in the case where the transmission device 10 determines that the modulation scheme to be applied to the second radio resource is not the quadrature amplitude modulation (NO in S206B) or determines that there is no first radio resource overlapping with the second radio resource in the time axis direction (NO in S203), the transmission device 10 may skip the above-described processing in S204 and S205 without executing the processing. In this case, the second known signal may not be inserted in a part of the second radio resource.

Note that the transmission device 10 may execute the determination in S203 and the determination in S206B in an arbitrary order. For example, the transmission device 10 may execute the determination in S203 after executing the determination in S206B.

The above flow is an example of a flow of processing in the transmission device 10 of the wireless communication system according to Example 3 illustrated in FIG. 11. Note that the flow of the processing illustrated in FIG. 3 may be combined with the flow of the processing illustrated in FIG. 11. For example, the processing in S101 to S103 illustrated in FIG. 3 may be executed at arbitrary timing after the determination of YES in S203 or at arbitrary timing after the determination of YES in S206B.

Figure 12:
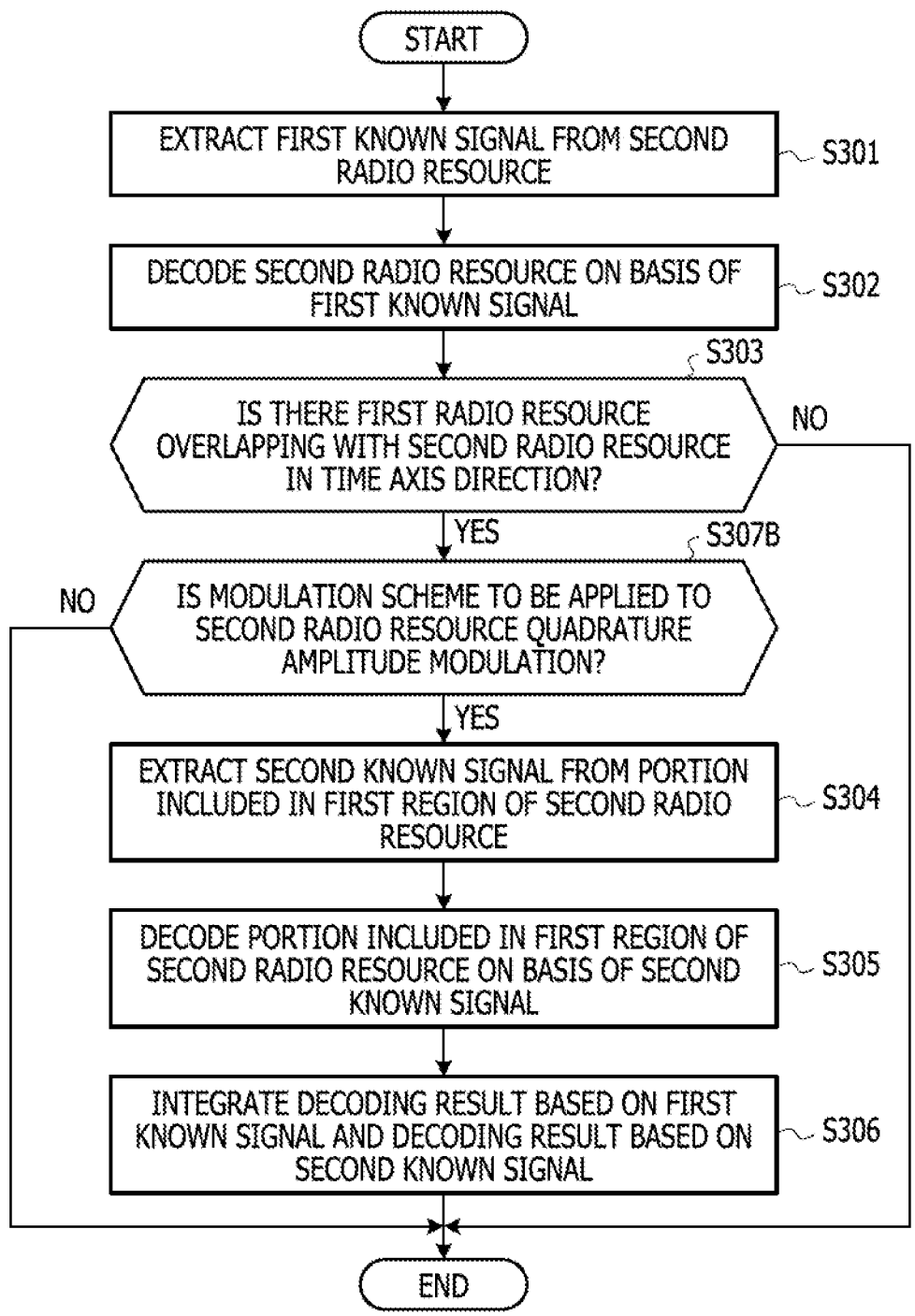
FIG. 12 is a diagram illustrating an example of a flow of processing in a reception device of the wireless communication system according to Example 3.

FIG. 12 is a diagram illustrating an example of a flow of processing in a reception device 20 of a wireless communication system according to Example 3. The flow of the processing illustrated in FIG. 12 may be executed at arbitrary timing. For example, the reception device 20 may execute the processing in FIG. 12 when the wireless signal corresponding to the second radio resource scheduled in the second slot unit longer than the first slot is received. Note that, in FIG. 12, similar parts to those in FIG. 8 or 10 are given the same reference numerals.

The reception device 20 extracts the first known signal from the second radio resource (S301) and decodes the second radio resource on the basis of the extracted first known signal (S302). In S302, the reception device 20 may not be able to determine whether the second radio resource includes the second known signal. In other words, in the case where the second radio resource includes the second known signal, the reception device 20 may try to decode transmission data (that can also be called second data) of the second service mapped in the second radio resource from the resource element in which the second known signal is arranged in S302. In that case, the reception device 20 may fail in decoding the second data mapped to the second radio resource, similarly to the example illustrated in FIG. 8 or 10.

The reception device 20 determines whether there is the first radio resource in a range (that can also be called first region) overlapping with the second radio resource in the time axis direction (S303). In S303, the reception device 20 may determine whether having received data of the first service (which can also be called first data) using the first radio resource included in the first region. For example, the reception device 20 may try to decode the data of the first service (first data) that may have been mapped in the first radio resource scheduled in the first slot unit shorter than the second slot. As a result, in the case where the decoding of the first data is successful, the reception device 20 may determine that there is the first radio resource in the first region (YES in S303). On the other hand, in the case where the decoding of the first data fails, the reception device 20 may determine that there is no the first radio resource in the first region (NO in S303). Here, in S303, determining whether having received the first service data (that can also be called first data) by the first radio resource included in the first region is an example of determining whether there is the first radio resource in the first region.

Furthermore, for example, in S303, the reception device 20 may determine whether the first radio resource is reserved in a time range (that can also be called first region) in which the first radio resource overlaps with the second radio resource in the time axis direction. For example, in the case where the first radio resource is reserved in the first region, the reception device 20 may determine that there is the first radio resource in the first region (YES in S303). For example, in the case where the first radio resource is not reserved in the first region, the reception device 20 may determine that there is no first radio resource in the first region (NO in S303). Here, in S303, determining whether the first radio resource is reserved in the first region is an example of determining whether there is the first radio resource in the first region.

In the case where the reception device 20 determines that there is no first radio resource in the first region (NO in S303), the reception device 20 may adopt a decoding result (a result in S302) of the second radio resource based on the first known signal as a decoding result of the second radio resource and terminate the processing illustrated in FIG. 12.

In the case where the reception device 20 determines that there is the first radio resource in the first region (YES in S303), the reception device 20 determines whether the modulation scheme to be applied to the second radio resource is quadrature amplitude modulation (that can also be called QAM) (S307B).

In S307B, the reception device 20 may determine that the modulation scheme is quadrature amplitude modulation in the case where the modulation scheme to be applied to the second radio resource is any of 16QAM (4 bits/symbols), 64QAM (6 bits/symbols), 256QAM (8 bits/symbols), or 1024QAM (10 bits/symbols) (YES in S307B), for example. Meanwhile, in S307B, the reception device 20 may determine that the modulation scheme is not the quadrature amplitude modulation in the case where the modulation scheme to be applied to the second radio resource is either binary phase shift keying (BPSK, which can also be called two-phase shift keying (2PSK)) (1 bit/symbol) or quadrature phase shift keying (QPSK, which can also be called 4PSK) (2 bits/symbols) (NO in S307B), for example. Note that quadrature amplitude modulation in the present disclosure is an example of a technology of transmitting information of a plurality of bits per symbol by a combination of a phase and an amplitude. Such a modulation scheme may be called, for example, amplitude phase shift keying (APSK).

In the case where the reception device 20 determines that the modulation scheme to be applied to the second radio resource is quadrature amplitude modulation (YES in S307B), the reception device 20 extracts the second known signal from the portion of the second radio resource included in the first region (S304). The first region may be, for example, a range in which the first radio resource and the second radio resource overlap in the time axis direction. In S304, the reception device 20 may specify the arrangement (the number and position) of the second known signals according to the number of symbols included in the first region and the like. For example, the arrangement may be set such that the number of second known signals increases in proportion to the number of symbols included in the first region. For example, the arrangement may be set such that the position of the second known signal and/or the number of the second known signals may be different according to the radio quality of the second radio resource. Here, the radio quality of the second radio resource may be replaced with, for example, a modulation scheme to be applied to the second data mapped to the second radio resource. In general, the radio quality may be more favorable as the modulation scheme having a larger amount of information carried in one symbol is applied.

The reception device 20 decodes the portion of the second radio resource included in the first region on the basis of the extracted second known signal (S305). In S305, the reception device 20 can exclude, from a decoding target, the portion of the second radio resource included in the first region, the portion corresponding to the second known signal. Then, the reception device 20 integrates a decoding result based on the first known signal (a result of S302) and a decoding result based on the second known signal (a result of S305) (S306). Thereby, it is avoided that the reception device 20 tries to decode transmission data (that can also be called second data) of the second service mapped in the second radio resource from the resource element in which the second known signal is arranged. As a result, the reception device 20 can successfully decode the second radio resource.

In the case where the reception device 20 determines that the modulation scheme to be applied to the second radio resource is not quadrature amplitude modulation (NO in S307B), the reception device 20 may adopt a decoding result (a result in S302) of the second radio resource based on the first known signal as a decoding result of the second radio resource and terminate the processing illustrated in FIG. 12. In this case, the second known signal is not inserted in the second radio resource in the first region, and thus the decoding result (result in S302) of the second radio resource based on the first known signal can be successful.

Note that the reception device 20 may execute the determination in S303 and the determination in S307B in an arbitrary order. For example, the reception device 20 may execute the determination in S303 after executing the determination in S307B.

The above flow is an example of a flow of processing in the reception device 20 of the wireless communication system 1 according to Example 3 illustrated in FIG. 12.

According to one aspect of Example 3 disclosed above, the second known signal can be inserted in the first region in which a plurality of radio resources in different scheduling time units overlaps in the time axis direction. Thereby, the second radio resource can be appropriately decoded on the basis of the first known signal and the second known signal in the radio frame in which schedulings in a plurality of different time units are mixed. As a result, wireless communication can be appropriately performed in the wireless communication system that allows the radio frame structure in which schedulings in a plurality of different time units are mixed. Such an effect is useful in implementing various wireless services such as eMBB, URLLC, and mMTC in the 5G system.

According to another aspect of Example 3 disclosed above, the transmission device 10 can insert the second known signal to a part of the second radio resource included in the first region in the case where the modulation scheme to be applied to the second radio resource is the quadrature amplitude modulation. In other words, the transmission device 10 according to Example 3 can omit insertion of the second known signal to the second radio resource included in the first region in the case where the modulation scheme to be applied to the second radio resource is not the quadrature amplitude modulation. This is because, in the case where the modulation scheme to be applied to the second radio resource is not the quadrature amplitude modulation, the reception device 20 can theoretically appropriately modulate the second radio resource even if the transmission power allocated to the second radio resource is changed in the first region. In this case, the transmission device 10 according to Example 3 can increase the amount of transmission data (second data) of the second service to be mapped to the second radio resource by omitting insertion of the second known signal. Therefore, the wireless communication system 1 according to Example 3 can improve the use efficiency of radio resources. In other words, according to another aspect of Example 3, in the radio frame structure in which schedulings in a plurality of different time units are mixed, the use efficiency of the radio resources can be improve while enabling appropriate operation of wireless communication. Such an effect is useful in implementing various wireless services such as eMBB, URLLC, and mMTC in the 5G system.

According to another aspect of Example 3 disclosed above, the reception device 20 can extract the second known signal from the second radio resource included in the first region in the case where the modulation scheme to be applied to the second radio resource is the quadrature amplitude modulation. In other words, the reception device 20 according to Example 3 can omit extraction of the second known signal from the second radio resource included in the first region in the case where the modulation scheme to be applied to the second radio resource is not the quadrature amplitude modulation. This is because, in the case where the modulation scheme to be applied to the second radio resource is not the quadrature amplitude modulation, the reception device 20 according to Example 3 can theoretically appropriately modulate the second radio resource even if the transmission power allocated to the second radio resource is changed in the first region. In this case, in the wireless communication system 1 according to Example 3, the amount of transmission data (second data) of the second service to be mapped to the second radio resource increases by omitting insertion of the second known signal to the second radio resource. Therefore, the wireless communication system 1 according to Example 3 can improve the use efficiency of radio resources. In other words, according to another aspect of Example 3, in the radio frame structure in which schedulings in a plurality of different time units are mixed, the use efficiency of the radio resources can be improve while enabling appropriate operation of wireless communication. Such an effect is useful in implementing various wireless services such as eMBB, URLLC, and mMTC in the 5G system.

EXAMPLE 4

Example 4 illustrates a wireless communication system 1 that allows a radio frame in which schedulings in a plurality of different time units are mixed. According to one aspect of the wireless communication system 1 of Example 4, a transmission device 10 determines an arrangement pattern of a second known signal to be inserted to a second radio resource according to a modulation scheme to be applied to second data of a second wireless service. According to one aspect of the wireless communication system 1 of Example 4, a reception device 20 determines an arrangement pattern of the second known signal to be extracted from the second radio resource according to the modulation scheme to be applied to the second data of the second wireless service. According to one aspect of Example 4, wireless communication can be more appropriately performed in a radio frame structure in which schedulings in a plurality of different time units are mixed.

Figure 13:
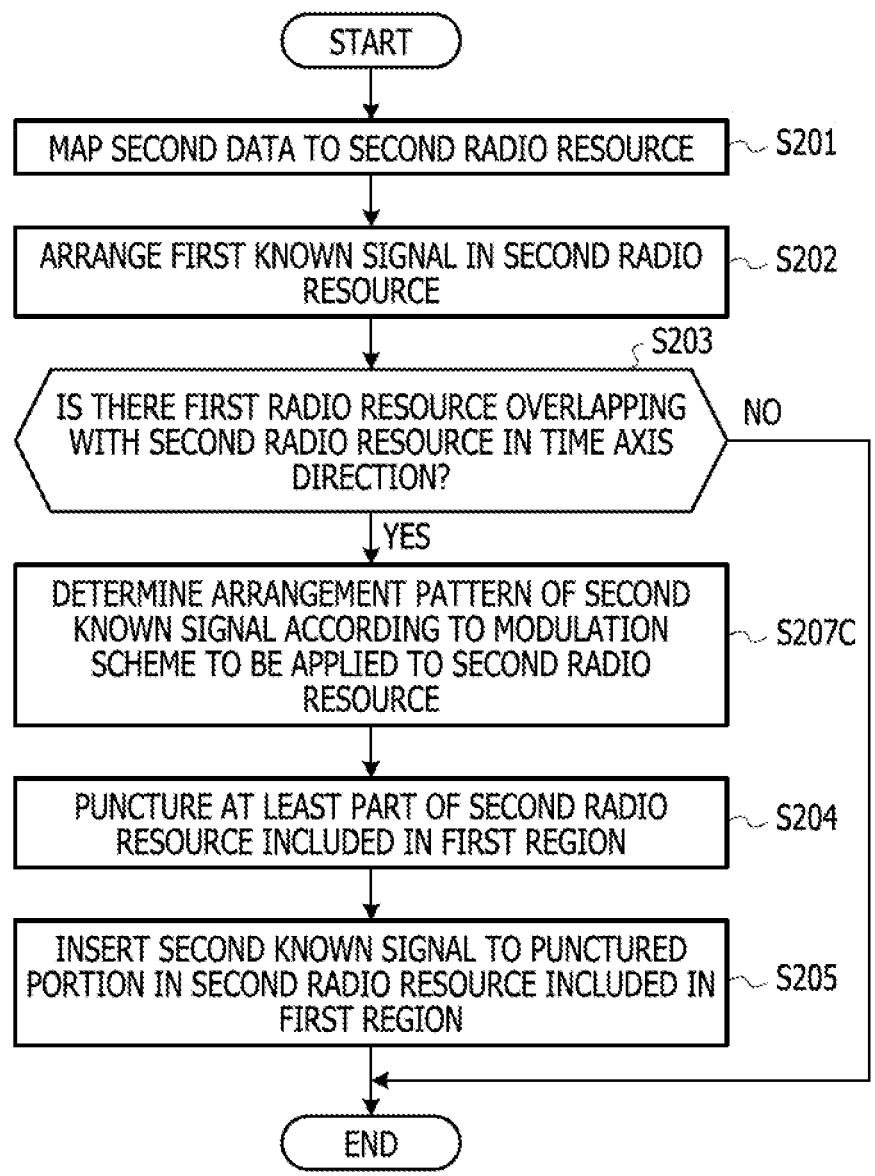
FIG. 13 is a diagram illustrating an example of a flow of processing in a transmission device of a wireless communication system according to Example 4.

FIG. 13 is a diagram illustrating an example of a flow of processing in the transmission device 10 of the wireless communication system 1 according to Example 4. The flow of the processing illustrated in FIG. 13 may be executed at arbitrary timing. For example, in the transmission device 10, the processing illustrated in FIG. 13 may be executed when the second radio resource is scheduled in a second slot unit.

The transmission device 10 maps transmission data (that can also be called second data) of the second service to the second radio resource scheduled in the second slot unit (S201), and further arranges a known signal (that can also be called first known signal) having a predetermined signal sequence in a part of the second radio resource (S202). In S202, the first known signal may be a demodulation reference signal (DM-RS) that can be obtained when the reception device 20 decodes the second data from the second radio resource, for example. The transmission device 10 may execute processing in S201 and processing in S202 in an arbitrary order. For example, the transmission device 10 may be configured to execute the processing in S201 after executing the processing in S202.

The transmission device 10 determines whether there is a first radio resource in a time range (that can also be called first region) overlapping with the second radio resource in a time axis direction (S203). For example, in the case where there is allocation of the first radio resource scheduled in a first slot unit that is a time unit different from the second slot in the first region that is a region overlapping with the second radio resource in the time axis direction, the transmission device 10 may determine that there is the first radio resource in the first region (YES in S203). Furthermore, for example, in the case where the first radio resource is reserved in the first slot unit in the first region overlapping with the second radio resource in the time axis direction, the transmission device 10 may determine that there is the first radio resource in the first region (YES in S203). Furthermore, for example, in the case where there is no allocation of the first radio resource scheduled in the first slot unit that is a time unit different from the second slot and the first radio resource is not reserved in the first region that is a region overlapping with the second radio resource in the time axis direction, the transmission device 10 may determine that there is no first radio resource in the first region (NO in S203).

In the case where the transmission device 10 determines that there is the first radio resource in the first region overlapping with the second radio resource in the time axis direction (YES in S203), the transmission device 10 determines the arrangement pattern of the second known signal to be inserted to the second radio resource according to the modulation scheme to be applied to the second radio resource (S207C). In S207C, the transmission device 10 may select an arrangement pattern in which the number of the second known signals arranged in the second radio resource becomes larger as the modulation scheme has a larger information amount (bit length) carried in one symbol. In other words, in 207C, the transmission device 10 may select an arrangement pattern in which the number of the second known signals arranged in the second radio resource becomes smaller as the modulation scheme has a smaller information amount (bit length) carried in one symbol.

FIG. 14 is a diagram illustrating an example of a relationship between the modulation scheme to be applied to the second radio resource and the arrangement pattern of the second known signal. FIG. 14 illustrates that the arrangement pattern (T102) is "TYPE-A" in the case where the modulation scheme (T101) is "BPSK" and "QPSK", for example.

Figure 15:
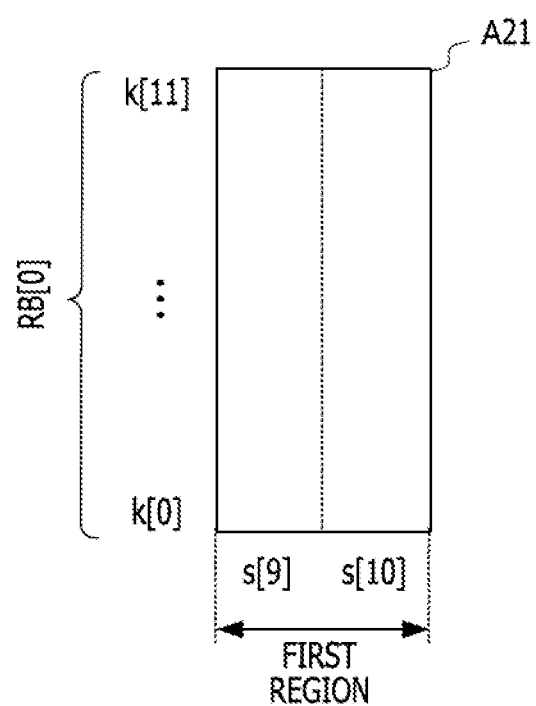
FIG. 15 is a diagram illustrating an example of an arrangement pattern (TYPE-A) of a second known signal.

FIG. 15 is a diagram illustrating an example of the arrangement pattern (TYPE-A) of the second known signal. FIG. 15 illustrates the second radio resource (A21) in the first region illustrated in FIG. 2. In other words, the second radio resource (A21) in the first region illustrated in FIG. 15 includes the tenth symbol (s[9]) from the beginning and the eleventh symbol (s[10]) from the beginning. As illustrated in FIG. 15, in the arrangement pattern (TYPE-A) of the second known signal, the number of second known signals arranged is zero. In other words, the second known signal is not arranged in the arrangement pattern (TYPE-A) of the second known signal.

The description returns to the description of FIG. 14. FIG. 14 illustrates that the arrangement pattern (T102) is "TYPE-B" in the case where the modulation scheme (T101) is "16QAM", "64QAM", and "256QAM", for example.

Figure 16:
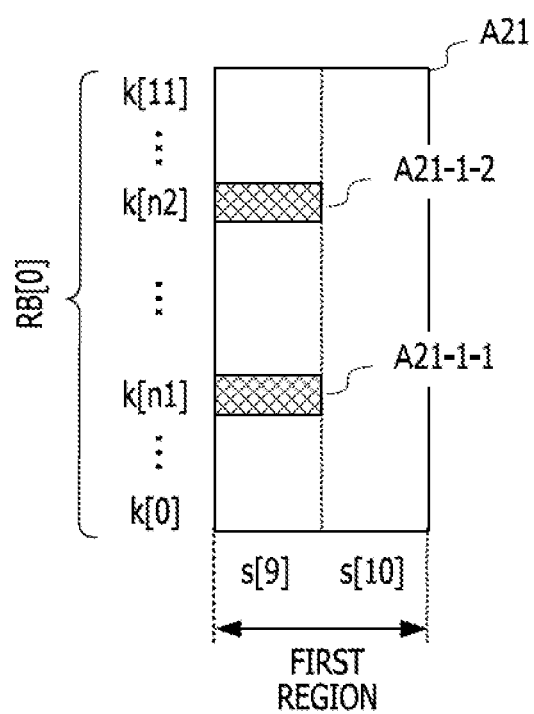
FIG. 16 is a diagram illustrating an example of an arrangement pattern (TYPE-B) of a second known signal.

FIG. 16 is a diagram illustrating an example of the arrangement pattern (TYPE-B) of the second known signal. FIG. 16 illustrates the second radio resource (A21) in the first region illustrated in FIG. 2, similarly to FIG. 15. As illustrated in FIG. 16, in the arrangement pattern (TYPE-B) of the second known signal, the number of second known signals arranged is two. In other words, in the arrangement pattern (TYPE-B) of the second known signal, the second known signals (A21-1-1 and A21-1-2) are arranged in four subcarriers (k[n1] and k[n2]) in the tenth symbol (s[9]) from the beginning. Here, the subcarriers (k[n1]) and k[n2]) may be subcarriers selected according to a predetermined logic from twelve subcarriers (s[0] to s[11]) included in a first resource block (RB[0]).

Note that the arrangement pattern of the second known signal is not limited to two types. In other words, the arrangement pattern of the second known signal may be, for example, three or more types.

FIG. 17 is a diagram illustrating another example of the relationship between the modulation scheme to be applied to the second radio resource and the arrangement pattern of the second known signal. FIG. 17 illustrates that the arrangement pattern (T102A) is "TYPE-A" in the case where the modulation scheme (T101A) is "BPSK" and "QPSK", for example. The arrangement pattern (TYPE-A) of the second known signal may be similar to the arrangement pattern illustrated in FIG. 15, and thus detailed description will be omitted.

FIG. 17 illustrates that the arrangement pattern (T102A) is "TYPE-B" in the case where the modulation scheme (T101A) is "16QAM". The arrangement pattern (TYPE-B) of the second known signal may be similar to the arrangement pattern illustrated in FIG. 16, and thus detailed description will be omitted.

FIG. 17 illustrates that the arrangement pattern (T102A) is "TYPE-C" in the case where the modulation scheme (T101A) is "64QAM".

Figure 18:
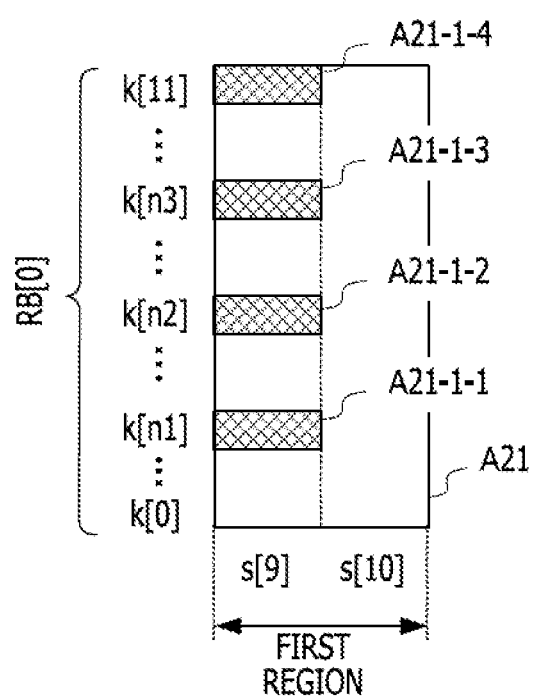
FIG. 18 is a diagram illustrating an example of an arrangement pattern (TYPE-C) of a second known signal.

FIG. 18 is a diagram illustrating an example of an arrangement pattern (TYPE-C) of a second known signal. FIG. 18 illustrates the second radio resource (A21) in the first region illustrated in FIG. 2, similarly to FIGS. 15 and 16. As illustrated in FIG. 18, in the arrangement pattern (TYPE-C) of the second known signal, the number of second known signals arranged is four. In other words, in the arrangement pattern (TYPE-C) of the second known signal, the second known signals (A21-1-1 to A21-1-4) are arranged in four subcarriers (k[n1], k[n2], k[n3], and k[11]) in the tenth symbol (s[9]) from the beginning. Here, the four subcarriers (k[n1], k[n2], k[n3], and k[11]) may be subcarriers selected according to a predetermined logic from twelve subcarriers (s[0] to s[11]) included in the first resource block (RB[0]).

The description returns to the description of FIG. 17. FIG. 17 illustrates that the arrangement pattern (T102A) is "TYPE-D" in the case where the modulation scheme (T101A) is "256QAM".

Figure 19:
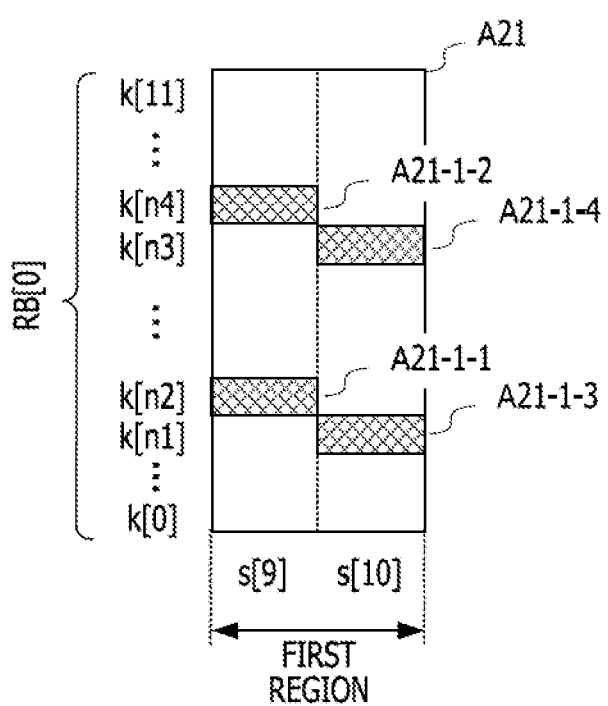
FIG. 19 is a diagram illustrating an example of an arrangement pattern (TYPE-D) of a second known signal.

FIG. 19 is a diagram illustrating an example of an arrangement pattern (TYPE-D) of a second known signal. FIG. 19 illustrates the second radio resource (A21) in the first region illustrated in FIG. 2, similarly to FIGS. 15 and 16. As illustrated in FIG. 19, in the arrangement pattern (TYPE-D) of the second known signal, the number of second known signals arranged is four. In FIG. 19, in the arrangement pattern (TYPE-D) of the second known signal, the second known signals (A21-1-1 and A21-1-2) are arranged in two subcarriers (k[n2] and k[n4]) in the tenth symbol (s[9]). Furthermore, the second known signals (A21-1-3 and A21-1-4) are arranged in two subcarriers (k[n1] and k[n3]) in the eleventh symbol (s[10]). Here, the four subcarriers (k[n1], k[n2], k[n3], and k[n4]) may be subcarriers selected according to a predetermined logic from twelve subcarriers (s[0] to s[11]) included in the first resource block (RB[0]).

The description returns to the description of FIG. 13. The transmission device 10 punctures at least a part of the second radio resource included in the first region according to the arrangement pattern determined in S207C (S204). In S204, the transmission device 10 may puncture a portion corresponding to a resource element in which the second known signal is arranged according to the arrangement pattern determined in S207C.

The transmission device 10 inserts the second known signal to a punctured portion in the second radio resource included in the first region (S205). In S205, in the case of uplink, the transmission device 10 may generate a signal sequence of the second known signal according to the procedure shown in TS38.211§ 6.4.1.1.1 Sequence generation, for example. In S205, in the case of downlink, the transmission device 10 may generate a signal sequence of the second known signal according to the procedure shown in TS38.211 § 7.4.1.1.1 Sequence generation, for example.

On the other hand, in the case where the transmission device 10 determines that there is no first radio resource in the first region overlapping with the second radio resource in the time axis direction (NO in S203), the transmission device 10 may skip the processing in S204 and S205 without executing the processing.

The above flow is an example of a flow of processing in the transmission device 10 of the wireless communication system 1 according to Example 4 illustrated in FIG. 13. Note that the flow of the processing illustrated in FIG. 3 may be combined with the flow of the processing illustrated in FIG. 13. For example, the processing in S101 to S103 illustrated in FIG. 3 may be executed at arbitrary timing after the determination of YES in S203.

Figure 20:
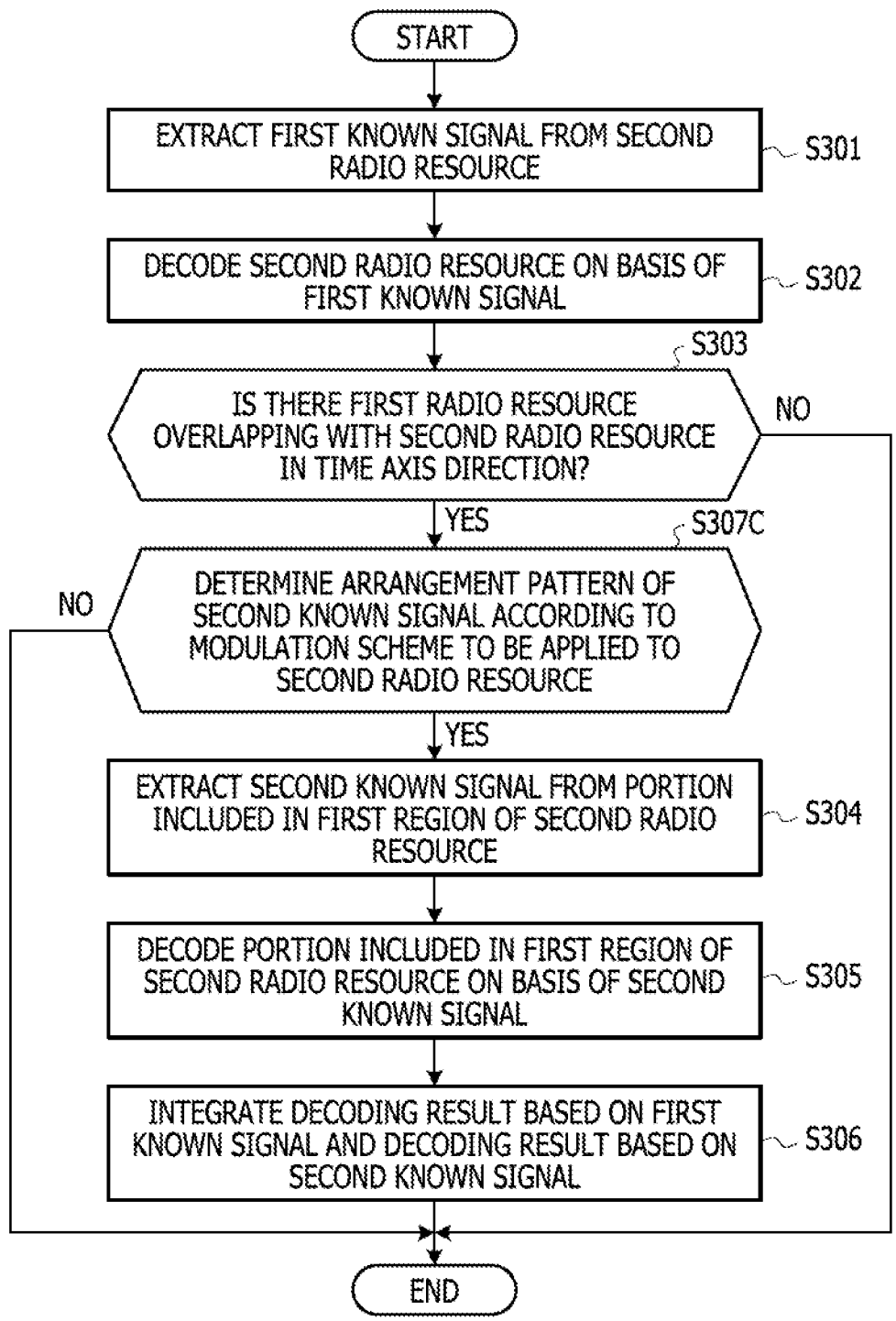
FIG. 20 is a diagram illustrating an example of a flow of processing in a reception device of a wireless communication system according to Example 4.

FIG. 20 is a diagram illustrating an example of a flow of processing in a reception device 20 of a wireless communication system according to Example 4. The flow of the processing illustrated in FIG. 20 may be executed at arbitrary timing. For example, the reception device 20 may execute the processing in FIG. 20 when the wireless signal corresponding to the second radio resource scheduled in the second slot unit longer than the first slot is received. Note that, in FIG. 20, similar parts to those in FIG. 8, 10, or 12 are given the same reference numerals.

The reception device 20 extracts the first known signal from the second radio resource (S301) and decodes the second radio resource on the basis of the extracted first known signal (S302). In S302, the reception device 20 may not be able to determine whether the second radio resource includes the second known signal. In other words, in the case where the second radio resource includes the second known signal, the reception device 20 may try to decode transmission data (that can also be called second data) of the second service mapped in the second radio resource from the resource element in which the second known signal is arranged in S302. In that case, the reception device 20 may fail in decoding the second data mapped to the second radio resource, similarly to the example illustrated in FIG. 8, 10, or 12.

The reception device 20 determines whether there is the first radio resource in a range (that can also be called first region) overlapping with the second radio resource in the time axis direction (S303). In S303, the reception device 20 may determine whether having received data of the first service (which can also be called first data) using the first radio resource included in the first region. For example, the reception device 20 may try to decode the data of the first service (first data) that may have been mapped in the first radio resource scheduled in the first slot unit shorter than the second slot. As a result, in the case where the decoding of the first data is successful, the reception device 20 may determine that there is the first radio resource in the first region (YES in S303). On the other hand, in the case where the decoding of the first data fails, the reception device 20 may determine that there is no the first radio resource in the first region (NO in S303). Here, in S303, determining whether having received the first service data (that can also be called first data) by the first radio resource included in the first region is an example of determining whether there is the first radio resource in the first region.

Furthermore, for example, in S303, the reception device 20 may determine whether the first radio resource is reserved in a time range (that can also be called first region) in which the first radio resource overlaps with the second radio resource in the time axis direction. For example, in the case where the first radio resource is reserved in the first region, the reception device 20 may determine that there is the first radio resource in the first region (YES in S303). For example, in the case where the first radio resource is not reserved in the first region, the reception device 20 may determine that there is no first radio resource in the first region (NO in S303). Here, in S303, determining whether the first radio resource is reserved in the first region is an example of determining whether there is the first radio resource in the first region.

In the case where the reception device 20 determines that there is no first radio resource in the first region (NO in S303), the reception device 20 may adopt a decoding result (a result in S302) of the second radio resource based on the first known signal as a decoding result of the second radio resource and terminate the processing illustrated in FIG. 12.

In the case where the reception device 20 determines that there is the first radio resource in the first region (YES in S303), the reception device 20 determines the arrangement pattern of the second known signal according to the modulation scheme to be applied to the second radio resource (S307C). In S307C, the reception device 20 may select an arrangement pattern in which the number of the second known signals arranged in the second radio resource becomes larger as the modulation scheme has a larger information amount (bit length) carried in one symbol. In other words, in 307C, the reception device 20 may select an arrangement pattern in which the number of the second known signals arranged in the second radio resource becomes smaller as the modulation scheme has a smaller information amount (bit length) carried in one symbol. For the relationship between the modulation scheme applied to the second radio resource and the arrangement pattern of the second known signal, refer to the example illustrated in FIG. 14, the example illustrated in FIG. 17, and the like.

The reception device 20 extracts the second known signal from the second radio resource included in the first region according to the arrangement pattern determined in S307C (S304). In S304, the reception device 20 may extract the second known signal from a portion corresponding to a resource element in which the second known signal is arranged according to the arrangement pattern determined in S307C.

The reception device 20 decodes the portion of the second radio resource included in the first region on the basis of the extracted second known signal (S305). In S305, the reception device 20 can exclude, from a decoding target, the portion of the second radio resource included in the first region, the portion corresponding to the second known signal. Then, the reception device 20 integrates a decoding result based on the first known signal (a result of S302) and a decoding result based on the second known signal (a result of S305) (S306). Thereby, it is avoided that the reception device 20 tries to decode transmission data (that can also be called second data) of the second service mapped in the second radio resource from the resource element in which the second known signal is arranged. As a result, the reception device 20 can successfully decode the second radio resource.

The above flow is an example of a flow of processing in the reception device 20 of the wireless communication system 1 according to Example 4 illustrated in FIG. 20.

According to one aspect of Example 4 disclosed above, the second known signal can be inserted in the first region in which a plurality of radio resources in different scheduling time units overlaps in the time axis direction. Thereby, the second radio resource can be appropriately decoded on the basis of the first known signal and the second known signal in the radio frame in which schedulings in a plurality of different time units are mixed. As a result, wireless communication can be appropriately performed in the wireless communication system that allows the radio frame structure in which schedulings in a plurality of different time units are mixed. Such an effect is useful in implementing various wireless services such as eMBB, URLLC, and mMTC in the 5G system.

According to another aspect of Example 4 disclosed above, the transmission device 10 can determine the arrangement pattern of the second known signal to be inserted to the second radio resource included in the first region according to the modulation scheme to be applied to the second radio resource. For example, an arrangement pattern in which the number of the second known signals arranged in the second radio resource becomes larger as the modulation scheme has a larger information amount (bit length) carried in one symbol can be selected. In other words, an arrangement pattern in which the number of the second known signals arranged in the second radio resource becomes smaller as the modulation scheme has a smaller information amount (bit length) carried in one symbol may be selected. In general, the resistance to a wireless channel estimation error, noise, and signal waveform distortion becomes lower as the modulation scheme has a larger information amount (bit length) carried in one symbol. Therefore, the resistance to the deterioration of the transmission quality may be secured by increasing the number of second known signals arranged in the second radio resource as the modulation scheme has a larger information amount (bit length) carried in one symbol. In other words, the resistance to the wireless channel estimation error, noise, and signal waveform distortion becomes higher as the modulation scheme has a smaller information amount (bit length) carried in one symbol. Therefore, the use efficiency of the radio resources may be improved by decreasing the number of second known signals arranged in the second radio resource as the modulation scheme has a smaller information amount (bit length) carried in one symbol.

As described above, the transmission device 10 according to Example 4 can determine the arrangement pattern of the second known signal to be inserted to the second radio resource included in the first region according to the modulation scheme to be applied to the second radio resource. Thereby, in the radio frame structure in which schedulings in a plurality of different time units are mixed, the use efficiency of the radio resources can be improve while enabling appropriate operation of wireless communication. Such an effect is useful in implementing various wireless services such as eMBB, URLLC, and mMTC in the 5G system.

According to another aspect of Example 4, the reception device 20 can determine the arrangement pattern of the second known signal to be extracted from the second radio resource included in the first region according to the modulation scheme to be applied to the second radio resource. Thereby, in the radio frame structure in which schedulings in a plurality of different time units are mixed, the use efficiency of the radio resources can be improve while enabling appropriate operation of wireless communication. Such an effect is useful in implementing various wireless services such as eMBB, URLLC, and mMTC in the 5G system.

Figure 21:
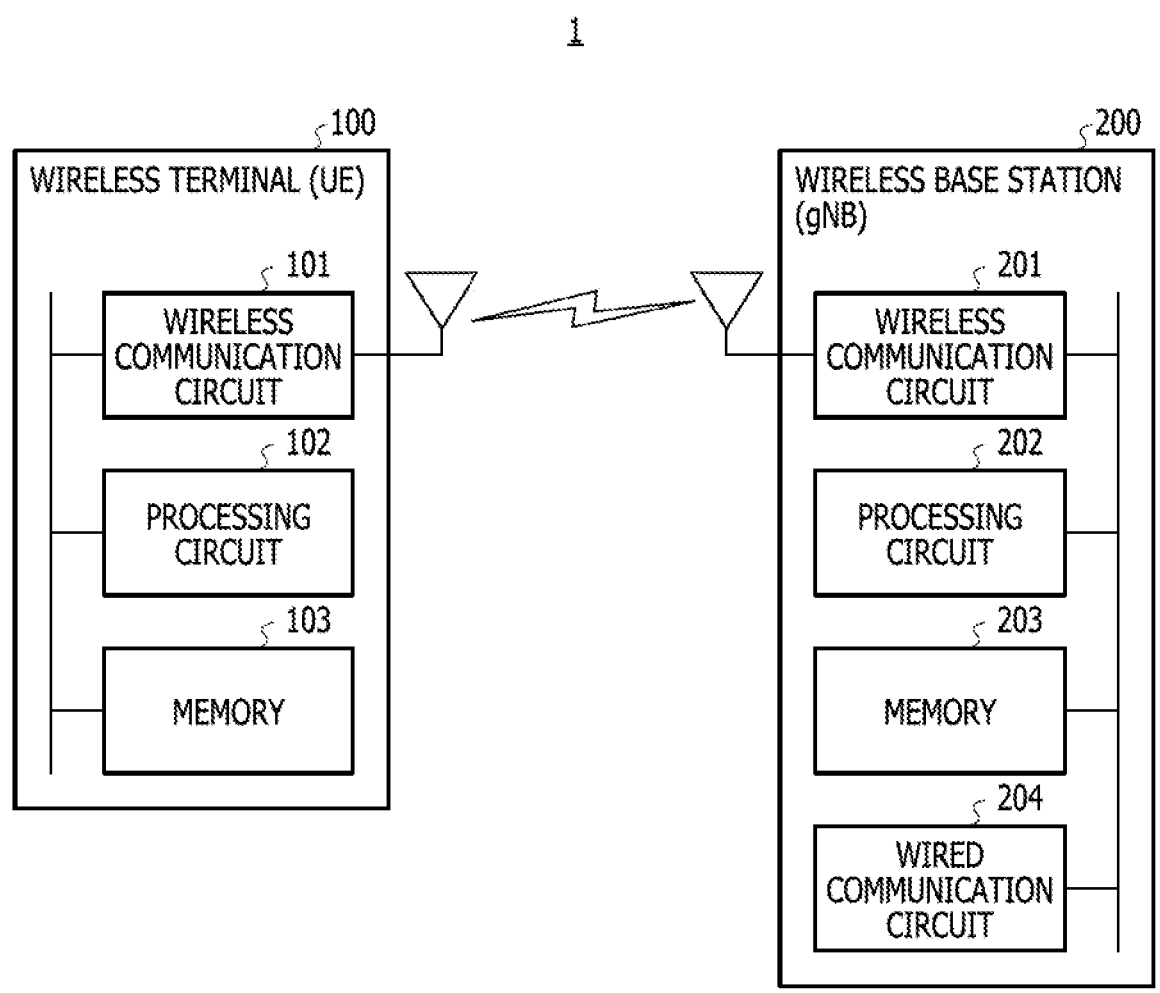
FIG. 21 is a diagram illustrating an example of a hardware configuration of a wireless terminal and a wireless base station in a wireless communication system 1.

<Hardware Configuration> Finally, a hardware configuration of a device used in each of the above-disclosed examples will be briefly described. FIG. 21 is a diagram illustrating an example of a hardware configuration of the wireless terminal (UE) 100 and the wireless base station (gNB) 200 in the wireless communication system 1. The UE 100 is an example of the transmission device 20 in uplink and an example of the reception device 10 in downlink. The gNB 200 is an example of the reception device 20 in uplink and an example of the transmission device 10 in downlink.

The UE 100 in FIG. 21 includes a wireless communication circuit 101, a processing circuit 102, and a memory 103. Note that, in the UE 100 in FIG. 21, illustration of some components such as an antenna is omitted. Furthermore, the UE 100 may include a display device such as a liquid crystal display, an input device such as a touch panel, a battery such as a lithium-ion rechargeable battery, and the like.

The wireless communication circuit 101 is configured to receive a baseband signal (that can also be called wireless signal or digital wireless signal) from the processing circuit 102, generate a wireless signal (that can also be called second wireless signal or analog wireless signal) at a predetermined output level from the baseband signal, and emit the wireless signal into the space via an antenna. Thereby, the UE 100 can transmit the wireless signal to the gNB 200. Furthermore, the wireless communication circuit 101 is configured to receive the wireless signal input from the antenna, convert the wireless signal into a baseband signal, and supply the baseband signal to the processing circuit 102. Thereby, the UE 100 can receive the wireless signal from the gNB 200. As described above, the wireless communication circuit 101 is configured to be able to transmit and receive the wireless signal and has a function to perform wireless communication with the gNB 200.

The wireless communication circuit 101 can be communicatively connected to the processing circuit 102 via a transmission circuit mounted inside the UE 100. An example of such a transmission circuit includes a transmission circuit compliant with standards such as M-PHY and Dig-RF.

The processing circuit 102 (also called processor circuit or arithmetic circuit) is a circuit configured to perform baseband signal processing. The processing circuit 102 is configured to generate a baseband signal (also called wireless signal or digital wireless signal) on the basis of protocol stack in the wireless communication system 1 and output the baseband signal to the wireless communication circuit 101. Furthermore, the processing circuit 102 is configured to perform reception processing such as demodulation or decoding for the baseband signal input from the wireless communication circuit 101 on the basis of the protocol stack in the wireless communication system 1. In other words, in uplink, the processing circuit 102 has an aspect as a circuit that causes the wireless communication circuit 101 to transmit the wireless signal on the basis of the second data obtained by sequentially processing the first data addressed to the gNB 200 as transmission data from an upper layer to a lower layer, according to a procedure of the protocol stack in which the wireless communication function is divided into a plurality of layers. Furthermore, the processing circuit 102 has an aspect as a circuit that sequentially processes the wireless signal received via the wireless communication circuit 101 from a lower layer to an upper layer, according to the procedure of the protocol stack in which the wireless communication function is divided into a plurality of layers. Here, receiving an input of the baseband signal from the wireless communication circuit 101 has an aspect of receiving the wireless signal from the gNB 200 via the wireless communication circuit 101.

The processing circuit 102 may be an arithmetic device that reads and executes a program stored in the memory 103, for example, to implement operation of the UE 100 according to the above-described examples. In other words, the processing circuit 102 has an aspect as a main entity (that can also be called arithmetic device) that executes the flows of the processing in the operations (for example, the operations illustrated in FIGS. 3, 11, and 13) of the transmission device 10 and the operations of the reception device 20 (for example, the operations illustrated in FIGS. 8, 10, 12, and 20) according to the above-described examples. Examples of the processing circuit 102 include a central processing unit (CPU), a micro-processing unit (MPU), a digital signal processor (DSP), a field programmable gate array (FPGA), a combination thereof, and the like. Note that the processing circuit 102 may be a multi-core processor including two or more cores. Furthermore, the processing circuit 102 may mount two or more processing circuits 102 according to the layers in one protocol stack of the wireless communication system 1.

The processing circuit 102 may also be called C-CPU. The UE 100 may mount a processor circuit, which is also called A-CPU for executing an application, in addition to the processing circuit 102. Note that the processing circuit 102 may be mounted on a single chip together with the processor circuit that can also be called A-CPU or may be mounted as a separate chip. As described above, the processing circuit 102 has an aspect as a control unit having a function to control the operation of the UE 100.

The memory 103 is a circuit configured to store and retain data and programs related to the baseband signal processing executed by the processing circuit 102. The memory 103 includes a nonvolatile storage device and/or a volatile storage device. Examples of such storage devices include a random access memory (RAM), a read only memory (ROM), a solid-state drive (SSD), a hard disk drive (HDD), and the like. In FIG. 21, the memory 103 is the collective term for various storage devices such as a main storage and an auxiliary storage. Note that the memory 103 may mount two or more memories 103 according to the layers in the protocol stack in the wireless communication system 1, similarly to the processing circuit 102.

The gNB 200 illustrated in FIG. 21 includes a wireless communication circuit 201, a processing circuit 202, a memory 203, and a wired communication circuit 204.

In downlink, the wireless communication circuit 201 is configured to receive the baseband signal from the processing circuit 202, generate a wireless signal at a predetermined output level from the baseband signal, and emit the wireless signal into the space via an antenna. Furthermore, in uplink, the wireless communication circuit 201 is configured to receive the wireless signal input from the antenna, convert the wireless signal into a baseband signal, and supply the baseband signal to the processing circuit 202. The wireless communication circuit 201 can be communicatively connected to the processing circuit 202 via a transmission path such as a common public radio interface (CPRI) and can also be called remote radii head (RRH) or remote radio equipment (RRE). Furthermore, the combination of the wireless communication circuit 201 and the processing circuit 202 is not limited to one-to-one, and one wireless communication circuit 201 can correspond to a plurality of the processing circuits 202, a plurality of the wireless communication circuits 201 can correspond to one processing circuit 202, or a plurality of the wireless communication circuits 201 can correspond to a plurality of the processing circuits 202. As described above, the wireless communication circuit 201 has an aspect as a communication unit (that can also be called transmission/reception unit or second transmission/reception unit) having the function to perform wireless communication with the UE 100.

The processing circuit 202 is a circuit configured to perform the baseband signal processing. In downlink, the processing circuit 202 is configured to generate a baseband signal on the basis of the protocol stack in the wireless communication system and output the baseband signal to the wireless communication circuit 201. Furthermore, in uplink, the processing circuit 202 is configured to perform the reception processing such as demodulation or decoding for the baseband signal input from the wireless communication circuit 201 on the basis of the protocol stack in the wireless communication system. In other words, in downlink, the processing circuit 202 has an aspect as a circuit that sequentially processes the transmission data addressed to the UE 100 as a reception device from an upper layer to a lower layer and transmits the transmission data via the wireless communication circuit 201, according to the procedure of the protocol stack in which the wireless communication function is divided into a plurality of layers. Furthermore, in uplink, the processing circuit 202 has an aspect as a circuit that sequentially processes the wireless signal received via the wireless communication circuit 201 from a lower layer to an upper layer, according to the procedure of the protocol stack in which the wireless communication function is divided into a plurality of layers. Here, in uplink, receiving an input of the baseband signal from the wireless communication circuit 201 has an aspect of receiving the wireless signal from the UE 100 via the wireless communication circuit 201.

The processing circuit 202 has an aspect as a main entity (which may also be called arithmetic device) that executes the flows of the processing in the operations (for example, the operations illustrated in FIGS. 3, 11, and 13) of the transmission device 10 and the operations of the reception device 20 (for example, the operations illustrated in FIGS. 8, 10, 12, and 20) according to the above-described examples by reading and executing a program stored in the memory 203, for example. The processing circuit 202 may be a central processing unit (CPU), a micro-processing unit (MPU), a digital signal processor (DSP), a field programmable gate array (FPGA), or the like, for example. Note that the processing circuit 202 may be a multi-core processor including two or more cores. Furthermore, the processing circuit 202 may mount two or more processing circuits 202 according to the layers in one protocol stack of the wireless communication system. For example, a processing circuit 202 that executes processing as a MAC entity belonging to a MAC layer, a processing circuit 202 that executes processing as an RLC entity that belongs to an RLC layer, and a processing circuit 202 that executes processing as a PDCP entity that belongs to a PDCP layer may be separately mounted. As described above, the processing circuit 202 has an aspect as a control unit (which may also be called second control unit to be distinguished from the control unit of the UE 100) having a function to control the operation of the gNB 200. For example, the processing circuit 202 executes processing of transmitting various types of information (for example, first setting information and second setting information) to the UE 100. Note that the various types of setting information may also be called control signal.

The memory 203 is a circuit configured to store and retain data and programs related to the baseband signal processing executed by the processing circuit 202. The memory 203 includes a nonvolatile storage device and/or a volatile storage device. Examples of such storage devices include a random access memory (RAM), a read only memory (ROM), a solid-state drive (SSD), a hard disk drive (HDD), and the like. In FIG. 21, the memory 203 is the collective term for various storage devices such as a main storage and an auxiliary storage. Note that the memory 203 may mount two or more memories 203 according to the layers in the protocol stack in the wireless communication system, similarly to the processing circuit 202. For example, the memory 203 may individually mount a memory 203 used in the processing as the MAC entity belonging to the MAC layer, a memory 203 used in the processing as the RLC entity belonging to the RLC layer, and a memory 203 used in the processing as the PDCP entity belonging to the PDCP layer.

The wired communication circuit 204 converts data into packet data in an outputtable format to another device and transmits the packet data to the another device, and extracts data and the like from packet data received from another device and outputs the extracted data to the memory 203, the processing circuit 202, and the like. Examples of the another device include another wireless base station, a mobility management entity (MME), a serving gateway (SGW), and the like. The MME and SGW are also called core nodes, and a logical communication interface used for communication with the core nodes can also be called S1 interface. A logical communication interface used for communication with another wireless base station can also be called X2 interface.

From the above detailed description, the characteristics and advantages of the present disclosure will become clear. This is intended to cover the characteristics and advantages of the present disclosure described above without departing from the spirit and the scope of the claims. Further, any person having ordinary knowledge in the technical field should be able to easily come up with various improvements and modifications. Therefore, there is no intention to limit the range of disclosure having inventiveness to those described above, and the range of disclosure can be based on appropriate improvements and equivalents included in the range disclosed in the present specification. For example, the respective steps disclosed in this specification do not need to be carried out chronologically in the order described as an example of the processing flow, and the sequence of the steps may be changed within the scope of the gist of the present invention described in the claims. Alternatively, a plurality of steps may be carried out in parallel. Note that situations that can occur in the 5G system that are clarified in the above detailed description can be found when the 5G system is examined from one aspect, and other situations can be found when examined from other aspects. In other words, the features and advantages of the present invention are not limited to applications for solving the problems specified in the above detailed description.

Lastly, the configurations of the examples and modifications in the present disclosure are examples for embodying the technical idea of the present invention, and it is not intended that the present invention is limited to the configurations of these examples and modifications and the present invention is equally applicable to other embodiments within the scope of the claims. For example, note that the terms in the present disclosure may be renamed in future 5G system specification development. Furthermore, note that one or more alternative names listed for the terms in the present disclosure may be synonymous with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a transmission device configured to simultaneously transmit first data by using a first radio resource and transmit second data by using a second slot, the second slot having a longer time length than the first radio resource; and
a reception device,
wherein the transmission device is configured to
map the second data to the second radio resource allocated to the second data,
insert a known signal to a part of the second radio resource in a first region overlapping with the first radio resource to which the first data is able to be mapped in a time axis direction, in the second radio resource to which the second data is mapped, and
transmit the first data and the second data, and
wherein the reception device is configured to
specify a position of the first radio resource allocated to the first data,
specify the first region in which the first radio resource and the second radio resource overlap in the time axis direction, and
exclude a portion corresponding to the known signal arranged in the part of the second radio resource in the first region from a decoding target when decoding the second data from the second radio resource.

2. The wireless communication system according to claim 1, wherein
the transmission device is further configured to
set transmission power to be allocated to the second radio resource in the first region to be lower than transmission power to be allocated to the second radio resource outside the first region.

3. The wireless communication system according to claim 1, wherein,
the transmission device is configured to, in a case of receiving allocation of the first radio resource to the first data after mapping the second data to the second radio resource,
set a range in which the allocated first radio resource and the second radio resource overlap in the time axis direction as the first region, and
insert the known signal to a part of the second radio resource in the first region.

4. The wireless communication system according to claim 1, wherein
the transmission device is further configured to
set a range in which the periodically allocated first radio resource and the second radio resource to which the second data is mapped overlap in the time axis direction as the first region, and
insert the known signal to a part of the second radio resource in the first region.

5. The wireless communication system according to claim 1, wherein
  the transmission device is further configured to
    insert the known signal to a part of the second radio resource in the first region in a case where a modulation scheme to be applied to the second data is quadrature amplitude modulation, and
  the reception device is further configured to
    exclude a portion corresponding to the known signal arranged in the part of the second radio resource in the first region from a decoding target in the case where the modulation scheme to be applied to the second data is the quadrature amplitude modulation.

6. The wireless communication system according to claim 1, wherein
  the transmission device is further configured to
    insert the known signal to a part of the second radio resource in the first region according to an arrangement pattern associated with a modulation scheme to be applied to the second data, and
  the reception device is further configured to
    exclude a portion corresponding to the known signal arranged in the part of the second radio resource in the first region from a decoding target according to the arrangement pattern associated with the modulation scheme to be applied to the second data.

* * * * *